US012002607B2

(12) United States Patent
Itagaki et al.

(10) Patent No.: US 12,002,607 B2
(45) Date of Patent: Jun. 4, 2024

(54) FE-BASED AMORPHOUS ALLOY RIBBON AND METHOD FOR PRODUCING SAME, IRON CORE, AND TRANSFORMER

(71) Applicant: Proterial, Ltd., Tokyo (JP)

(72) Inventors: Hajime Itagaki, Tokyo (JP); Motoki Ohta, Tokyo (JP); Morifumi Kuroki, Tokyo (JP); Makoto Sasaki, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 201 days.

(21) Appl. No.: 17/043,477

(22) PCT Filed: Mar. 29, 2019

(86) PCT No.: PCT/JP2019/014154

§ 371 (c)(1),
(2) Date: Sep. 29, 2020

(87) PCT Pub. No.: WO2019/189813

PCT Pub. Date: Oct. 3, 2019

(65) Prior Publication Data

US 2021/0057133 A1 Feb. 25, 2021

(30) Foreign Application Priority Data

Mar. 30, 2018 (JP) ................................ 2018-069453

(51) Int. Cl.
*H01F 1/153* (2006.01)
*C22C 45/02* (2006.01)
(Continued)

(52) U.S. Cl.
CPC ......... *H01F 1/15308* (2013.01); *C22C 45/02* (2013.01); *H01F 1/15341* (2013.01); *H01F 27/25* (2013.01); *H01F 41/0226* (2013.01)

(58) Field of Classification Search
CPC ... H01F 1/00; H01F 1/01; H01F 1/015; H01F 1/03; H01F 1/12; H01F 1/14; H01F 1/147;
(Continued)

(56) References Cited

U.S. PATENT DOCUMENTS

| | | | | |
|---|---|---|---|---|
| 4,685,980 A * | 8/1987 | Sato | ......................... | C21D 1/09 336/213 |
| 2011/0030907 A1 | 2/2011 | Nakamoto et al. | | |

(Continued)

FOREIGN PATENT DOCUMENTS

| | | |
|---|---|---|
| CN | 105074841 A | 11/2015 |
| EP | 2463868 A1 | 6/2012 |

(Continued)

OTHER PUBLICATIONS

Written Opinion for related PCT Patent Application No. PCT/JP2019/014154 dated Jun. 11, 2019; 5 Pages.

(Continued)

*Primary Examiner* — Adil A. Siddiqui
(74) *Attorney, Agent, or Firm* — Brooks Kushman P.C.

(57) ABSTRACT

One aspect of the invention provides an Fe-based amorphous alloy ribbon having a free solidified surface and a roll contact surface, in which the Fe-based amorphous alloy ribbon has plural laser irradiation mark rows each formed from plural laser irradiation marks on at least one surface of the free solidified surface or the roll contact surface, a line interval is from 10 mm to 60 mm, which is a centerline interval in a middle section in a width direction, between mutually adjacent laser irradiation mark rows, a spot interval is from 0.10 mm to 0.50 mm, which is an interval between center points of the plural laser irradiation marks in each of the plural laser irradiation mark rows, and the number density D (=(1/d1)×(1/d2), d1: line interval, d2: spot inter-
(Continued)

val) of the laser irradiation marks is from 0.05 marks/$mm^2$ to 0.50 marks/$mm^2$.

15 Claims, 9 Drawing Sheets

(51) Int. Cl.
*H01F 27/25* (2006.01)
*H01F 41/02* (2006.01)

(58) Field of Classification Search
CPC .. H01F 1/14766; H01F 1/153; H01F 1/15308; H01F 1/15341; H01F 27/24; H01F 27/25; H01F 41/02; H01F 41/0206; H01F 41/0213; H01F 41/0226; C22C 45/00; C22C 45/008; C22C 45/02
See application file for complete search history.

(56) References Cited

U.S. PATENT DOCUMENTS

| | | | |
|---|---|---|---|
| 2012/0154054 A1 | 6/2012 | Kaczman et al. | |
| 2012/0154084 A1* | 6/2012 | Yoshizawa .......... | H01F 1/15341 335/297 |
| 2013/0098507 A1 | 4/2013 | Omura et al. | |
| 2016/0035474 A1* | 2/2016 | Azuma .............. | B23K 26/0622 29/605 |

FOREIGN PATENT DOCUMENTS

| | | |
|---|---|---|
| JP | A-S61-29103 | 2/1986 |
| JP | H04-367202 | 12/1992 |
| JP | 2012174824 A | 9/2012 |
| JP | 57-97606 A | 10/2015 |
| WO | 2011/030907 A1 | 3/2011 |
| WO | 2012/102379 A1 | 8/2012 |
| WO | 2014/142204 A1 | 9/2014 |

OTHER PUBLICATIONS

Office Action Chinese patent application No. 201980016966.5 dated Jun. 22, 2022, 22 pages.
Office Action of European patent application No. 19778066.1 dated May 14, 2021, 6 pages.
Second Office Action of Chinese patent application No. 201980016966.5 dated Feb. 18, 2023, 19 pages.
Decision of Refusal of Chinese application No. 201980016966.5 dated Jun. 30, 2023, 15 pages.
Chinese Office Action dated Mar. 15, 2024, for related Chinese Appln. No. 201980016966.5, 7 Pages.

* cited by examiner

ADJACENT ROWS PARALLEL TO EACH OTHER 15°/TO WIDTH DIRECTION

ADJACENT ROWS ALTERNATE AT 15° OR 165°/TO WIDTH DIRECTION

FE-BASED AMORPHOUS ALLOY RIBBON AND METHOD FOR PRODUCING SAME, IRON CORE, AND TRANSFORMER

CROSS-REFERENCE TO RELATED APPLICATIONS

This application is a national phase of PCT Application No. PCT/JP2019/014154 filed Mar. 29, 2019, which claims priority to Japanese Patent Application No. 2018-069453 filed 30 Mar. 2018, the disclosures of which are hereby incorporated in their entirety by reference herein.

TECHNICAL FIELD

The present disclosure relates to an Fe-based amorphous alloy ribbon and a method of producing the same, an iron core, and a transformer.

BACKGROUND ART

Fe-based amorphous (non-crystalline) alloy ribbons have become increasingly popular as iron core materials for transformers.

Japanese Patent Application Laid-Open (JP-A) No. S61-29103 discloses, as a method of simultaneously improving iron loss and excitation properties of an Fe-based non-crystalline alloy, a method of improving magnetic properties of a non-crystalline alloy ribbon, the method involving locally and instantaneously melting the surface of a non-crystalline alloy ribbon, then rapidly solidifying and non-crystallizing again the ribbon, and thereafter annealing the ribbon. JP-A No. S61-29103 discloses, as measures for locally melting the surface of a non-crystalline alloy ribbon, a laser beam focused to a beam diameter of 0.5 mmφ or less, a pulsed laser beam having a beam diameter of 0.5 mmφ or less, and pulsed laser having a beam diameter of 0.3 mmφ or less and an energy density per single pulse, of from 0.02 to 1.0 J/mm$^2$.

WO 2011/030907 discloses, as a soft magnetic amorphous alloy ribbon low in iron loss and apparent power and high in lamination factor, a soft magnetic amorphous alloy ribbon produced by a rapid solidification method, the alloy ribbon having, in the surface thereof, rows in the width direction, of depressed portions formed by a laser beam, at a predetermined interval in the longitudinal direction, in which each annular projected portion is formed around such each depressed portion, and such each annular projected portion not only has a smooth surface having thereon substantially no scattered alloy molten by laser beam irradiation, but also has a height $t_2$ of 2 μm or less and a ratio $t_1/T$ in a range of from 0.025 to 0.18, the ratio being the ratio of the depth $t_1$ of such each depressed portion to the thickness T of the ribbon, whereby the soft magnetic amorphous alloy ribbon has a low iron loss and a low apparent power.

WO 2012/102379 discloses, as a rapidly quenched Fe-based soft magnetic alloy ribbon reduced in iron loss, a rapidly quenched Fe-based soft magnetic alloy ribbon, in which wavy irregularities are formed on a free surface, the wavy irregularities have width direction troughs arranged at almost constant intervals in the longitudinal direction, and the average amplitude D of the troughs is 20 mm or less. Paragraph 0022 in WO 2012/102379 describes "The rapidly quenched Fe-based soft magnetic alloy ribbon of the present invention has wavy irregularities formed on a free surface, the wavy irregularities have width direction troughs arranged at almost constant intervals in the longitudinal direction, and the average amplitude D of the troughs is 20 mm or less, not only the eddy-current loss is reduced, but also the hysteresis loss is suppressed, and the low iron loss is extremely low . . . ".

SUMMARY OF INVENTION

Technical Problem

The iron loss and the exciting power of an Fe-based amorphous alloy ribbon have been conventionally measured commonly in a condition of a magnetic flux density of 1.3 T (see, for example, respective Examples in JP-A No. S61-29103, WO 2011/030907, and WO 2012/102379).

However, not the iron loss and the exciting power in a condition of a magnetic flux density of 1.3 T, but the iron loss and the exciting power in a condition of a magnetic flux density of 1.45 T have been recently demanded to be reduced in some cases from the viewpoint of, for example, downsizing of a transformer produced with an Fe-based amorphous alloy ribbon.

In this regard, it has been found from studies by the present inventors that a certain Fe-based amorphous alloy ribbon, while is not so high in exciting power measured in a condition of a magnetic flux density of 1.3 T, is remarkably increased in exciting power measured in a condition of a magnetic flux density of 1.45 T (see FIG. 2).

Iron core materials for transformers are also demanded to be low in exciting power.

An object of one aspect of the disclosure is to provide an Fe-based amorphous alloy ribbon reduced in iron loss in a condition of a magnetic flux density of 1.45 T and suppressed in an increase in exciting power in a condition of a magnetic flux density of 1.45 T, and a method of producing the Fe-based amorphous alloy ribbon.

An object of another aspect of the disclosure is to provide an iron core and a transformer each having excellent performance by use of the Fe-based amorphous alloy ribbon according to the above one aspect.

Solution to Problem

Specific solutions for solving the above problems encompass the following aspects.

<1> An Fe-based amorphous alloy ribbon having a free solidified surface and a roll contact surface, wherein the Fe-based amorphous alloy ribbon has a plurality of laser irradiation mark rows each configured from plural laser irradiation marks on at least one surface of the free solidified surface or the roll contact surface; and wherein the Fe-based amorphous alloy ribbon has:

a line interval of from 10 mm to 60 mm, the line interval being defined as a centerline interval in a middle section in a width direction, between mutually adjacent laser irradiation mark rows of a plurality of such laser irradiation mark rows arranged in a casting direction of the Fe-based amorphous alloy ribbon, the width direction being orthogonal to the casting direction, a spot interval of from 0.10 mm to 0.50 mm, the spot interval being defined as an interval between center points of the plurality of laser irradiation marks in each of the plurality of laser irradiation mark rows, and a number density D of the laser irradiation marks of from 0.05 marks/mm$^2$ to 0.50 marks/mm$^2$, provided that the line interval is d1 (mm), the spot interval is d2 (mm), and the number density D of the laser irradiation marks is D=(1/d1)×(1/d2).

<2> The Fe-based amorphous alloy ribbon according to <1>, wherein a proportion of a length in the width direction of the laser irradiation mark rows in an entire length in the width direction of the Fe-based amorphous alloy ribbon is in a range of from 10% to 50% in each direction from the center in the width direction toward both ends in the width direction.

<3> The Fe-based amorphous alloy ribbon according to <1> or <2>, wherein the laser irradiation mark rows are formed at least in six middle regions in the width direction, that are regions other than two regions at both ends of eight regions obtained by equally dividing the Fe-based amorphous alloy ribbon into eight parts in the width direction.

<4> The Fe-based amorphous alloy ribbon according to any one of <1> to <3>, wherein the free solidified surface has a maximum cross-sectional height Rt of 3.0 μm or less.

<5> The Fe-based amorphous alloy ribbon according to any one of <1> to <4>, consisting of Fe, Si, B, and impurities, wherein a content of Fe is 78 atom % or more, a content of B is 11 atom % or more, and a total content of B and Si is from 17 atom % to 22 atom % when a total content of Fe, Si, and B is 100 atom %.

<6> The Fe-based amorphous alloy ribbon according to any one of <1> to <5> having a thickness of from 20 μm to 35 μm.

<7> The Fe-based amorphous alloy ribbon according to any one of <1> to <6> having an iron loss, under conditions of a frequency of 60 Hz and a magnetic flux density of 1.45 T, of 0.160 W/kg or less, and an exciting power, under conditions of a frequency of 60 Hz and a magnetic flux density of 1.45 T, of 0.200 VA/kg or less.

<8> The Fe-based amorphous alloy ribbon according to <7>, consisting of Fe, Si, B, and impurities, wherein a content of Fe is 80 atom % or more, a content of B is 12 atom % or more, and a total content of B and Si is from 17 atom % to 20 atom % when a total content of Fe, Si, and B is 100 atom %.

<9> The Fe-based amorphous alloy ribbon according to any one of <1> to <8> having a magnetic flux density B0.1, under conditions of a frequency of 60 Hz and a magnetic field of 7.9557 A/m, of 1.52 T or more.

<10> The Fe-based amorphous alloy ribbon according to any one of <1> to <9>, for use at an operating magnetic flux density Bm, wherein a ratio of operating magnetic flux density Bin/saturated magnetic flux density Bs, is from 0.88 to 0.94.

<11> A method of producing an Fe-based amorphous alloy ribbon, comprising a step of preparing a material ribbon comprising an Fe-based amorphous alloy and having a free solidified surface and a roll contact surface, and a step of forming a plurality of laser irradiation mark rows each configured from a plurality of laser irradiation marks on at least one surface of the free solidified surface or the roll contact surface of the material ribbon, by laser processing, thereby obtaining an Fe-based amorphous alloy ribbon having a plurality of laser irradiation mark rows, wherein the Fe-based amorphous alloy ribbon has:

a line interval of from 10 mm to 60 mm, the line interval being defined as a centerline interval in a middle section in a width direction, between mutually adjacent laser irradiation mark rows of a plurality of such laser irradiation mark rows arranged in a casting direction of the Fe-based amorphous alloy ribbon, the width direction being orthogonal to the casting direction, a spot interval of from 0.10 mm to 0.50 mm, the spot interval being defined as an interval between center points of the plurality of laser irradiation marks in each of the plurality of laser irradiation mark rows, and a number density D of the laser irradiation marks of from 0.05 marks/mm$^2$ to 0.50 marks/mm$^2$, provided that the line interval is d1 (mm), the spot interval is d2 (mm), and the number density D of the laser irradiation marks is D=(1/d1)×(1/d2).

<12> The method of producing an Fe-based amorphous alloy ribbon according to <11>, wherein the laser irradiation marks are formed using a laser with a pulse energy of from 0.4 mJ to 2.5 mJ.

<13> The method of producing an Fe-based amorphous alloy ribbon according to <11> or <12>, wherein the laser irradiation marks are formed using a laser with a pulse width of laser for forming the laser irradiation marks of 50 nsec or more.

<14> An iron core, comprising a layered Fe-based amorphous alloy ribbon that includes a plurality of Fe-based amorphous alloy ribbon according to any one of <1> to <10>, and that is bent and wound in an overlapping manner, wherein the iron core has an iron loss, under conditions of a frequency of 60 Hz and a magnetic flux density of 1.45 T, of 0.250 W/kg or less.

<15> A transformer including an iron core that is formed using the Fe-based amorphous alloy ribbon according to any one of <1> to <10>, and a coil wound around the iron core, wherein the iron core is formed by layering the Fe-based amorphous alloy ribbon and bending and winding the layered Fe-based amorphous alloy ribbon in an overlapping manner, and has an iron loss of 0.250 W/kg or less, under conditions of a frequency of 60 Hz and a magnetic flux density of 1.45 T.

<16> An Fe-based amorphous alloy ribbon having a free solidified surface and a roll contact surface, wherein the Fe-based amorphous alloy ribbon has a plurality of laser irradiation mark rows each configured from a plurality of laser irradiation marks on at least one surface of the free solidified surface or the roll contact surface, and has a number density per unit area, of the laser irradiation marks, of from 0.05 marks/mm$^2$ to 0.50 marks/mm$^2$.

<17> The Fe-based amorphous alloy ribbon according to <16>, wherein the unit area is calculated from an area of a region in which the laser irradiation mark rows are formed in the width direction of the Fe-based amorphous alloy ribbon, and which has a length of 1 m in a casting direction or a length equal to an entire length in the casting direction when the length in the casting direction is less than 1 m.

<18> The Fe-based amorphous alloy ribbon according to <16> or <17>, consisting of Fe, Si, B, and impurities, wherein a content of Fe is 78 atom % or more, a content of B is 11 atom % or more, and a total content of B and Si is from 17 atom % to 22 atom % when a total content of Fe, Si, and B is 100 atom %.

<19> The Fe-based amorphous alloy ribbon according to any one of <16> to <18>, having an iron loss, under conditions of a frequency of 60 Hz and a magnetic flux density of 1.45 T, of 0.160 W/kg or less, and an exciting power, under conditions of a frequency of 60 Hz and a magnetic flux density of 1.45 T, of 0.200 VA/kg or less.

<20> The Fe-based amorphous alloy ribbon according to <19>, consisting of Fe, Si, B, and impurities, wherein a content of Fe is 80 atom % or more, a content of B is 12 atom % or more, and a total content of B and Si is from 17 atom % to 20 atom % when a total content of Fe, Si, and B is 100 atom %.

<21> The Fe-based amorphous alloy ribbon according to any one of <16> to <20>, having a magnetic flux density B0.1, under conditions of a frequency of 60 Hz and a magnetic field of 7.9557 A/m, of 1.52 T or more.

Advantageous Effects of Invention

One aspect of the disclosure provides an Fe-based amorphous alloy ribbon reduced in iron loss in a condition of a magnetic flux density of 1.45 T and suppressed in an increase in exciting power in a condition of a magnetic flux density of 1.45 T, and a method of producing the Fe-based amorphous alloy ribbon.

Another aspect of the disclosure provides an iron core and a transformer each having excellent performance by use of the Fe-based amorphous alloy ribbon according to the above one aspect.

DETAILED DESCRIPTION

Figure 1:
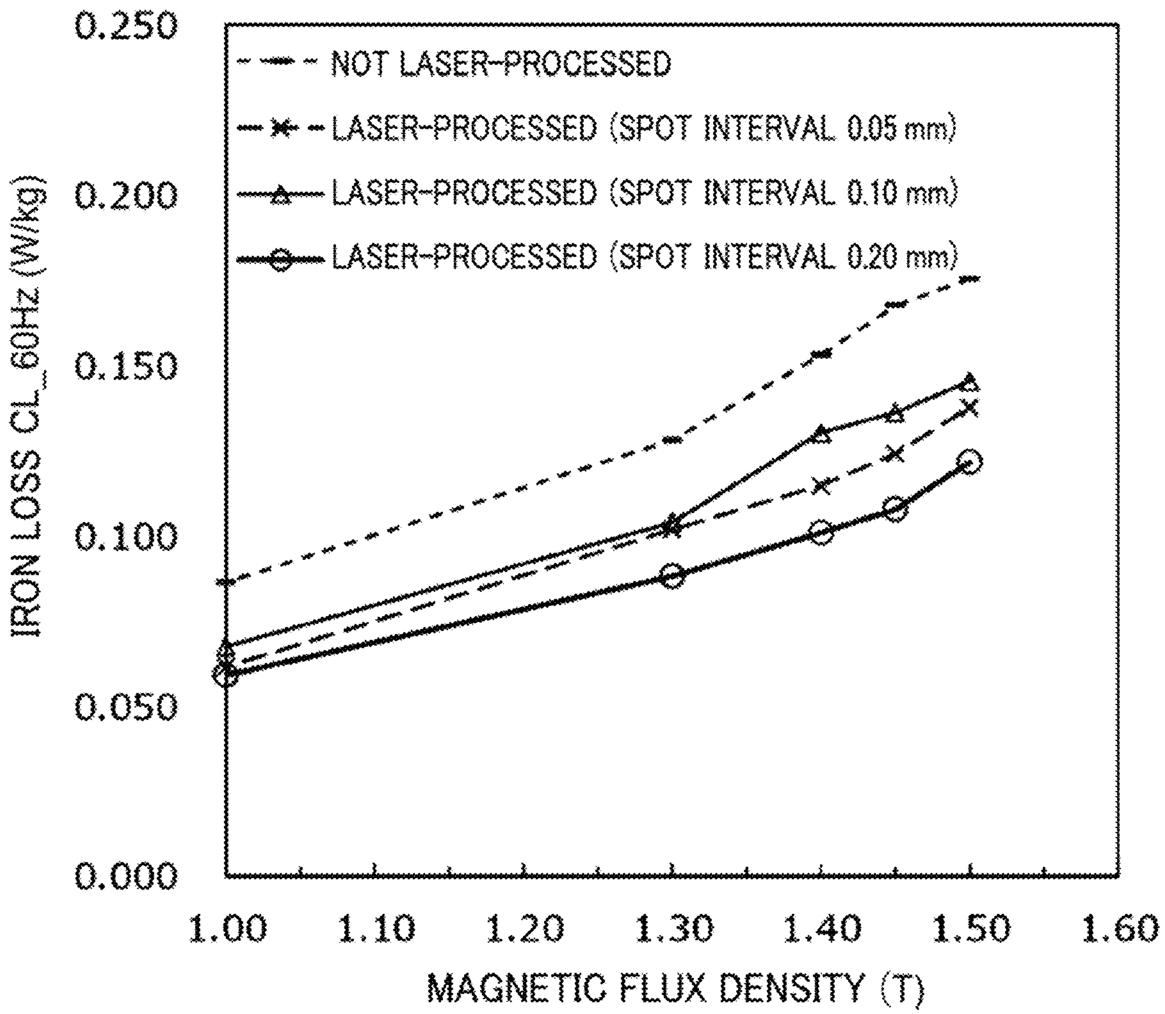
FIG. 1 is a graph illustrating a relationship between a magnetic flux density and an iron loss with respect to each of four Fe-based amorphous alloy ribbons.

A numerical value range herein represented with "(from) . . . to . . . " means any range encompassing respective numerical values described before and after "to" as the lower limit and the upper limit, respectively. The upper limit value or the lower limit value described in a numerical value range as a numerical value range described stepwise in the disclosure may be replaced with the upper limit value or the lower limit value of other numerical value range described stepwise. The upper limit value or the lower limit value described in a numerical value range described in the disclosure may be replaced with respective values shown in Examples.

The term "step" herein encompasses not only an independent step, but also a step that can achieve a predetermined object even in a case in which the step is not clearly distinguished from other steps.

The "free solidified surface" and the "free surface" herein have the same meaning.

The Fe-based amorphous alloy ribbon herein refers to a ribbon consisting of an Fe-based amorphous alloy.

The Fe-based amorphous alloy herein refers to an amorphous alloy containing Fe (iron) as a main component. The main component here refers to a component contained at the highest ratio (% by mass).

[Fe-Based Amorphous Alloy Ribbon]

The Fe-based amorphous alloy ribbon of the disclosure is an Fe-based amorphous alloy ribbon having a free solidified surface and a roll contact surface, in which the Fe-based amorphous alloy ribbon has plural laser irradiation mark rows each configured from plural laser irradiation marks on at least one surface of the free solidified surface or the roll contact surface; and in which the Fe-based amorphous alloy ribbon has:

a line interval of from 10 mm to 60 mm, the line interval being defined as a centerline interval in a middle section in a width direction, between mutually adjacent laser irradiation mark rows of plural such laser irradiation mark rows arranged in the casting direction of the Fe-based amorphous alloy ribbon, the width direction being orthogonal to the casting direction, a spot interval of from 0.10 mm to 0.50 mm, the spot interval being defined as an interval between center points of the plural laser irradiation marks in each of the plural laser irradiation mark rows, and a number density D of the laser irradiation marks of from 0.05 marks/mm$^2$ to 0.50 marks/mm$^2$, provided that the line interval is d1 (mm), the spot interval is d2 (mm), and the number density D of the laser irradiation marks is $D=(1/d1)\times(1/d2)$.

The Fe-based amorphous alloy ribbon of the disclosure (hereinafter, also simply referred to as "ribbon") has the above configuration, whereby the iron loss in a condition of a magnetic flux density of 1.45 T is reduced and an increase in exciting power in a condition of a magnetic flux density of 1.45 T is suppressed.

First, the effect of a reduction in iron loss in a condition of a magnetic flux density of 1.45 T is described.

The Fe-based amorphous alloy ribbon of the disclosure has plural laser irradiation mark rows each configured from plural laser irradiation marks on at least one surface of the free solidified surface or the roll contact surface, as described above.

The Fe-based amorphous alloy ribbon of the disclosure has such laser irradiation mark rows, whereby a magnetic domain is segmentalized, thereby resulting in a reduction in iron loss in a condition of a magnetic flux density of 1.45 T.

Thus, formation itself of the laser irradiation mark rows on the Fe-based amorphous alloy ribbon contributes to a reduction in iron loss in a condition of a magnetic flux density of 1.45 T.

Next, the effect of suppression of an increase in exciting power in a condition of a magnetic flux density of 1.45 T is described.

While the detail is described below, the inventors have found that formation of any laser irradiation mark on an Fe-based amorphous alloy ribbon may sometimes cause an increase in exciting power in a condition of a magnetic flux density of 1.45 T. Such an increase in exciting power in a condition of a magnetic flux density of 1.45 T is not desirable because a decrease in magnetic flux density B0.1 is caused.

In this regard, the Fe-based amorphous alloy ribbon of the disclosure is such that a line interval is from 10 mm to 60 mm in a case in which the line interval is defined as a centerline interval in a middle section in a direction, between mutually adjacent laser irradiation mark rows of plural such laser irradiation mark rows arranged in the casting direction of the ribbon, the direction (hereinafter, referred to as "width direction") being orthogonal to the casting direction and is such that the spot interval as an interval between center points of the plural laser irradiation marks is from 0.10 mm to 0.50 mm and a number density D of the laser irradiation marks is from 0.05 marks/$mm^2$ to 0.50 marks/$mm^2$ in a case in which the line interval is designated as d1 (mm), the spot interval is designated as d2 (mm), and the number density D of the laser irradiation marks is defined as $D=(1/d1)\times(1/d2)$. In summary, the Fe-based amorphous alloy ribbon of the disclosure is increased in spot interval and line interval between the laser irradiation marks to some extent and is reduced in the number of the laser irradiation marks to some extent (namely, is reduced in the number density of the laser irradiation marks to some extent).

The Fe-based amorphous alloy ribbon of the disclosure is increased in spot interval and line interval between the laser irradiation marks to some extent and is reduced in the number density of the laser irradiation marks to some extent, and thus is suppressed in an increase in exciting power in a condition of a magnetic flux density of 1.45 T.

In a case in which the laser irradiation mark rows do not reach the middle section in the width direction of the ribbon, the line interval can be measured by extending the laser irradiation mark rows to a position reaching the middle section in the width direction of the ribbon.

A decrease in magnetic flux density B0.1 according to an increase in exciting power is also suppressed.

As described above, the Fe-based amorphous alloy ribbon of the disclosure is reduced in iron loss in a condition of a magnetic flux density of 1.45 T and is suppressed in an increase in exciting power in a condition of a magnetic flux density of 1.45 T.

Hereinafter, the above effects of the Fe-based amorphous alloy ribbon of the disclosure will be described in more detail with compared to conventional techniques.

The iron loss and the exciting power have been conventionally measured commonly in a condition of a magnetic flux density of 1.3 T.

For example, Examples in JP-A No. S61-29103 described above disclose a reduction in iron loss in a condition of a magnetic flux density of 1.3 T by irradiating the free solidified surface of an Fe-based amorphous alloy ribbon with YAG laser at a point sequence interval of 5 mm.

Example 4 in WO 2011/030907 described above discloses reductions in iron loss and apparent power in a condition of a magnetic flux density of 1.3 T provided that, in a case in which the free solidified surface of an Fe-based amorphous alloy ribbon is irradiated with a laser beam, thereby forming depressed portion rows at an interval of 5 mm in the longitudinal direction, the ratio $t_1/T$ of the depth $t_1$ of such a depressed portion to the thickness T of the ribbon is from 0.025 to 0.18. The apparent power in WO 2011/030907 corresponds to the exciting power mentioned herein.

Example 1 in WO 2012/102379 described above discloses reductions in iron loss and exciting power in a condition of a magnetic flux density of 1.3 T provided that wavy irregularities are formed on the free solidified surface of an Fe-based amorphous alloy ribbon, the wavy irregularities have width direction troughs arranged at almost constant intervals in the longitudinal direction, and the average amplitude of the troughs is 20 mm or less.

However, not the iron loss and the exciting power in a condition of a magnetic flux density of 1.3 T, but the iron loss and the exciting power in a condition of a magnetic flux density of 1.45 T have been recently demanded to be reduced in some cases from the viewpoint of, for example, downsizing of a transformer produced with an Fe-based amorphous alloy ribbon.

In this regard, it has been found from studies by the inventors that a certain Fe-based amorphous alloy ribbon (specifically, Fe-based amorphous alloy ribbon high in the number density of laser irradiation marks), while is reduced in exciting power measured in a condition of a magnetic flux density of 1.3 T to some extent, is significantly increased in exciting power measured in a condition of a magnetic flux density of 1.45 T.

Hereinafter, this regard will be described with reference to FIG. 1 and FIG. 2.

FIG. 1 is a graph illustrating a relationship between a magnetic flux density and an iron loss with respect to each of four Fe-based amorphous alloy ribbons of an Fe-based amorphous alloy ribbon not laser-processed, an Fe-based amorphous alloy ribbon laser-processed at a spot interval of 0.05 mm, an Fe-based amorphous alloy ribbon laser-processed at a spot interval of 0.10 mm, and an Fe-based amorphous alloy ribbon laser-processed at a spot interval of 0.20 mm.

Figure 2:
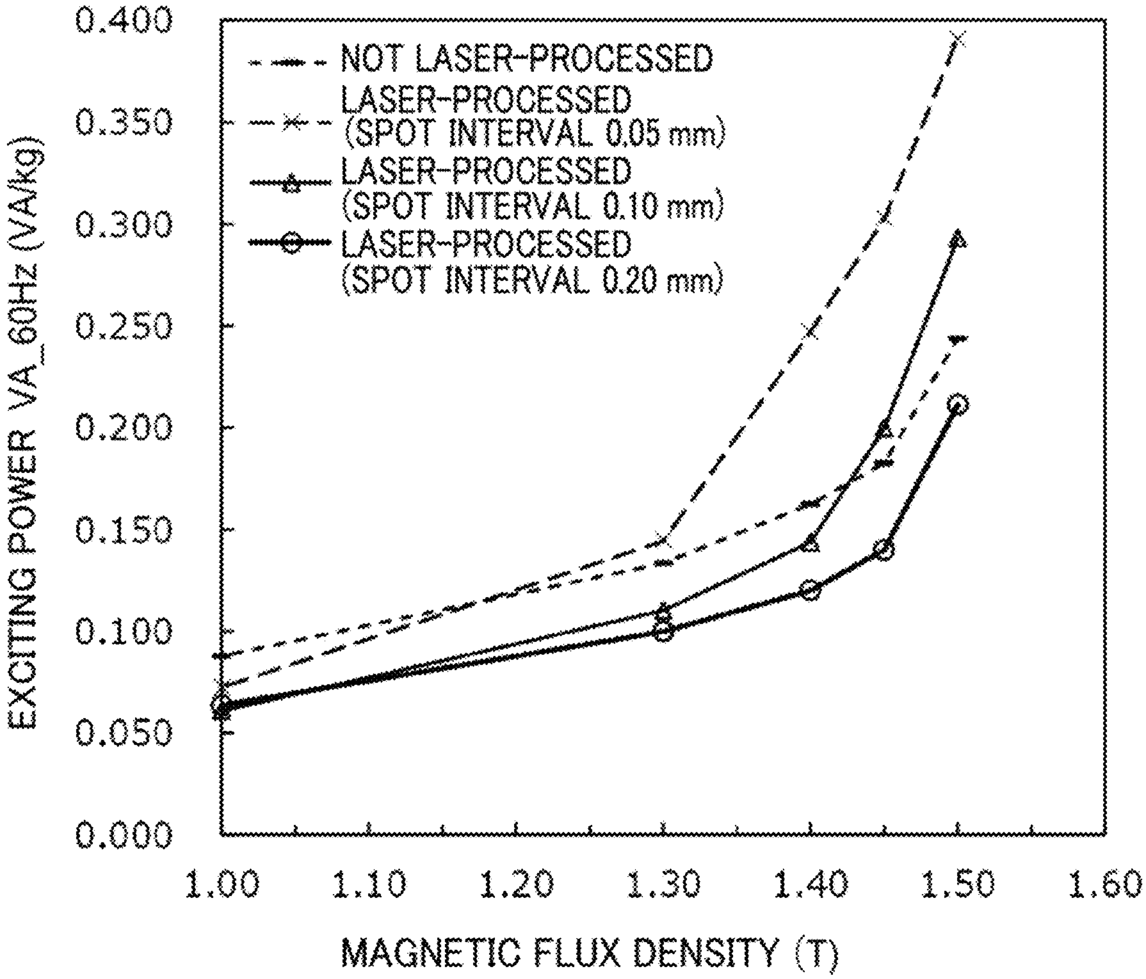
FIG. 2 is a graph illustrating a relationship between a magnetic flux density and an exciting power with respect to each of four Fe-based amorphous alloy ribbons.

In FIG. 1 and FIG. 2, the Fe-based amorphous alloy ribbon laser-processed at a spot interval of 0.05 mm is produced in the same conditions as in Comparative Example 2 described below except that the line interval is 60 mm.

In FIG. 1 and FIG. 2, the Fe-based amorphous alloy ribbon laser-processed at a spot interval of 0.10 mm is produced in the same conditions as in Example 1 described below except that the line interval is 60 mm.

In FIG. 1 and FIG. 2, the Fe-based amorphous alloy ribbon laser-processed at a spot interval of 0.20 mm is produced in the same conditions as in Example 3 described below (the line interval is 20 mm).

In FIG. 1 and FIG. 2, the Fe-based amorphous alloy ribbon not laser-processed is produced in the same conditions as in Comparative Example 1 described below.

As illustrated in FIG. 1, it can be seen that, as the magnetic flux density is increased, the iron loss is mildly increased in all the Fe-based amorphous alloy ribbons.

It can also be seen that the iron loss is reduced by subjecting the Fe-based amorphous alloy ribbons to laser processing in respective conditions of a spot interval of 0.05 mm, a spot interval of 0.10 mm, and a spot interval of 0.20 mm.

The effect itself of a reduction in iron loss by laser processing is as described in known documents such as JP-A No. S61-29103 and WO 2011/030907.

FIG. 2 is a graph illustrating a relationship between a magnetic flux density and an exciting power with respect to each of the above four Fe-based amorphous alloy ribbons.

As illustrated in FIG. 2, it can be seen that almost no difference in exciting power is found among such four Fe-based amorphous alloy ribbons in a condition of a magnetic flux density of 1.3 T. In other words, it can be seen that the presence of laser processing has almost no influence on the exciting power in a condition of a magnetic flux density of 1.3 T. Accordingly, the effect of a reduction in iron loss can be obtained with almost no increase in exciting power, by subjecting such Fe-based amorphous alloy ribbons to laser processing, under the assumption that the iron loss and the exciting power are measured at a magnetic flux density of 1.3 T.

However, it can be seen by paying attention to the Fe-based amorphous alloy ribbon at a spot interval of 0.05 mm in FIG. 2 that the exciting power is rapidly increased at a magnetic flux density of more than 1.3 T. It can be seen that the Fe-based amorphous alloy ribbon at a spot interval of 0.05 mm is consequently remarkably high in exciting power in a condition of magnetic flux density of 1.45 T, as compared with such other three Fe-based amorphous alloy ribbons.

The inventors have found as described above that the exciting power in a condition of magnetic flux density of 1.45 T is remarkably high in the case of a too narrow spot interval between the laser irradiation marks, for example, in the case of a spot interval of 0.05 mm (see FIG. 2). The inventors have also found that an increase in exciting power in a condition of magnetic flux density of 1.45 T can be suppressed by extending the spot interval to 0.10 mm or 0.20 mm (namely, decreasing the number density of the laser irradiation marks) (see FIG. 2).

The inventors have also found that the effect of a reduction in iron loss by laser processing is obtained even by extending the spot interval to 0.10 mm or 0.20 mm (see FIG. 1).

Such findings are also shown in Table 1 in Examples described below.

The inventors have also found that an increase in exciting power in a condition of a magnetic flux density of 1.45 T can be suppressed and the effect of a reduction in iron loss by laser processing can be obtained even by extending the line interval between such plural laser irradiation mark rows (specifically, allowing the line interval to be 10 mm or more) as in the case of extending of the spot interval.

Such a finding is shown in Table 2 in Examples described below.

The iron loss has been conventionally reduced by forming wavy irregularities on the free solidified surface of an Fe-based amorphous alloy ribbon, as described in, for example, WO 2012/102379 above.

Such wavy irregularities are also referred to as “chatter marks” or the like, and are generated due to paddle vibration in production (casting) of an Fe-based amorphous alloy ribbon (see, for example, paragraph 0008 in WO 2012/102379). Such wavy irregularities are intentionally formed on the free solidified surface by adjusting the production conditions of an Fe-based amorphous alloy ribbon in a technique for reducing the iron loss by formation of such wavy irregularities.

Conventional laser processing techniques described in, for example, JP-A No. S61-29103 and WO 2011/030907, on the contrary to such a technique for reducing the iron loss by formation of such wavy irregularities, are each a technique which is aimed at obtaining the same effect (the effect of a reduction in iron loss or the like) as in such wavy irregularities, by subjecting the free solidified surface to laser processing instead of formation of such wavy irregularities on the free solidified surface. Thus, the conventional laser processing techniques have formed laser irradiation marks at a narrower line interval for formation of a shape similar to such wavy irregularities (for example, at a line interval of 5 mm as described in Examples in JP-A No. S61-29103 and WO 2011/030907), namely, at a relatively higher number density of laser irradiation marks.

Since the exciting power has been conventionally measured in a condition of a magnetic flux density of 1.3 T, there has not been recognized any disadvantage (namely, an increase in exciting power) due to an increase in the number density of laser irradiation marks.

However, as described above, the inventors have found that an increase in the number density of laser irradiation marks can result in an increase in exciting power measured in a condition of a magnetic flux density of 1.45 T and have found that a decrease in the number density of laser irradiation marks can result in suppression of an increase in exciting power measured in a condition of a magnetic flux density of 1.45 T.

The Fe-based amorphous alloy ribbon of the disclosure has been made based on such findings.

Accordingly, the Fe-based amorphous alloy ribbon of the disclosure, although is common to the techniques described in JP-A No. S61-29103 and WO 2011/030907 in that laser irradiation marks are formed on the surface of the ribbon, is completely different from the techniques described in JP-A No. S61-29103 and WO 2011/030907 in that the Fe-based amorphous alloy ribbon of the disclosure corresponds to a technique which is aimed at decreasing the number density of the laser irradiation marks and thus suppressing an increase in exciting power measured in a condition of a magnetic flux density of 1.45 T.

Hereinafter, the Fe-based amorphous alloy ribbon of the disclosure and preferable aspects thereof will be described in more detail.

The Fe-based amorphous alloy ribbon of the disclosure is an Fe-based amorphous alloy ribbon having a free solidified surface and a roll contact surface.

The Fe-based amorphous alloy ribbon having a free solidified surface and a roll contact surface is a ribbon produced (cast) by a single roll method. The roll contact surface is a surface which is brought into contact with a cooling roll and rapidly solidified in casting, and the free solidified surface is a surface opposite to the roll contact surface (namely, a surface exposed to an atmosphere in casting).

Such a single roll method can be appropriately found in any known document such as WO 2012/102379.

The Fe-based amorphous alloy ribbon of the disclosure may be a ribbon not cut after casting (for example, a rolled article wound up in the form of a roll after casting) or may be a ribbon piece cut out to a desired size after casting.

<Laser Irradiation Marks and laser Irradiation Mark Rows>

The Fe-based amorphous alloy ribbon of the disclosure has plural laser irradiation mark rows each configured from plural laser irradiation marks on at least one surface of the free solidified surface or the roll contact surface.

Each of the plural laser irradiation marks configuring such each laser irradiation mark row may be any mark as long as such any mark is one to which energy is applied by laser processing (namely, laser irradiation), and the shapes of such each laser irradiation mark (shape in planar view and cross-sectional shape) are not particularly limited.

As long as each of the plural laser irradiation marks is any mark to which energy is applied by laser irradiation, the effect of a reduction in iron loss by laser irradiation is obtained.

The shape in planar view of such each laser irradiation mark may be any shape in planar view, such as a coronal, annular, or flat shape.

Such coronal, annular, and flat shapes are described in Examples described below.

The shape in planar view of such each laser irradiation mark is preferably an annular or flat shape, more preferably a flat shape from the viewpoints of weather resistance (rust prevention) of the laser irradiation marks in the Fe-based amorphous alloy ribbon and an enhancement in the lamination factor of the Fe-based amorphous alloy ribbon. In a case in which a flat shape is adopted and such ribbons are layered to configure a magnetic core, the space between such ribbons can be suppressed and the ribbon density in the magnetic core can be enhanced.

The Fe-based amorphous alloy ribbon of the disclosure has a line interval of from 10 mm to 60 mm in a case in which the line interval is defined as a centerline interval in a middle section in a width direction, between mutually adjacent laser irradiation mark rows of plural laser irradiation mark rows arranged in the casting direction of the Fe-based amorphous alloy ribbon, the width direction being orthogonal to the casting direction of the Fe-based amorphous alloy ribbon.

The width direction is a direction orthogonal to the casting direction of the Fe-based amorphous alloy ribbon.

In a case in which such laser irradiation mark rows are formed on both the free solidified surface and the roll contact surface of the ribbon, the line interval is measured with such laser irradiation mark rows on such both surfaces, in the case of transmissive viewing of the ribbon, being targeted. For example, in a case in which such laser irradiation mark rows are formed alternately on such both surfaces in the casting direction of the ribbon, such "mutually adjacent laser irradiation mark rows" are directed to any laser irradiation mark rows which are formed on one surface and any laser irradiation mark rows which are formed on other surface and which are adjacent in the casting direction.

In a case in which a line interval is 10 mm or more, an increase in exciting power measured in a condition of a magnetic flux density of 1.45 T is suppressed as compared with the case of a line interval of less than 10 mm.

In a case in which a line interval of 60 mm or less, the effect of a reduction in iron loss measured in a condition of a magnetic flux density of 1.45 T is excellent as compared with the case of a line interval of more than 60 mm.

The line interval is preferably from 10 mm to 50 mm, more preferably from 10 mm to 40 mm, still more preferably from 10 mm to 30 mm.

The directions of plural such laser irradiation mark rows are preferably substantially parallel, but are not limited to be substantially parallel. The directions of plural such laser irradiation mark rows may be parallel or non-parallel as long as at least the line interval in the middle section in the width direction of the ribbon is from 10 mm to 60 mm.

The "middle section in the width direction" of the Fe-based amorphous alloy ribbon can be each any portion having a certain width from the center in the width direction toward both ends in the width direction. For example, a region in which the "certain width" from the center in the width direction toward both ends in the width direction corresponds to ¼ of the entire width can be defined as such a middle section. In particular, a range in which the "certain width" corresponds to ½ of the entire width is more preferably defined as such a middle section.

In other words, plural such laser irradiation mark rows need not to be necessarily arranged in parallel as long as the line interval in the middle section in the width direction of the Fe-based amorphous alloy ribbon is from 10 mm to 60 mm.

An Fe-based amorphous alloy ribbon of one embodiment of the disclosure may have an arrangement relationship in which each direction of plural laser irradiation mark rows are not parallel to the width direction orthogonal to the casting direction of the Fe-based amorphous alloy ribbon.

In other words, each direction of plural laser irradiation mark rows may be crossed at an inclined angle of an acute angle or an obtuse angle to the casting direction, while being at an angle of 10° or more to the width direction of the Fe-based amorphous alloy ribbon.

It is preferable in an Fe-based amorphous alloy ribbon of another embodiment of the disclosure that each direction of plural laser irradiation mark rows is substantially parallel to the direction orthogonal to the casting direction and the thickness direction of the Fe-based amorphous alloy ribbon.

Each direction of plural laser irradiation mark rows being substantially parallel to the direction orthogonal to the casting direction and the thickness direction of the Fe-based amorphous alloy ribbon means that the angle between each direction of plural laser irradiation mark rows and the direction orthogonal to the casting direction and the thickness direction of the Fe-based amorphous alloy ribbon is 10° or less.

Such plural laser irradiation mark rows are not here limited to be substantially parallel.

It is preferable in an Fe-based amorphous alloy ribbon of one embodiment of the disclosure that each direction of plural laser irradiation mark rows are substantially parallel to the width direction of the Fe-based amorphous alloy ribbon.

Each direction of plural laser irradiation mark rows being substantially parallel to the width direction of the Fe-based amorphous alloy ribbon means that the angle between each direction of plural laser irradiation mark rows and the width direction of the Fe-based amorphous alloy ribbon is 10° or less.

Such plural laser irradiation mark rows are not here limited to be substantially parallel.

The Fe-based amorphous alloy ribbon of the disclosure may be an aspect in which the ribbon has, in the width direction thereof, one laser irradiation mark row with laser irradiation marks arranged at a constant interval in the width direction of the ribbon, or may be an aspect in which the ribbon has two or more of such laser irradiation mark rows.

Specifically, the Fe-based amorphous alloy ribbon of the disclosure may have plural laser irradiation mark rows arranged in the casting direction of the Fe-based amorphous alloy ribbon, as (1) an aspect of such any one row in the "middle section in the width direction" (hereinafter, referred to as "group of single row".) or (2) an aspect of plural such any rows in the "middle section in the width direction" (hereinafter, referred to as "group of plural rows".), in the width direction orthogonal to the casting direction.

Hereinafter, such plural laser irradiation mark rows arranged in the casting direction of the Fe-based amorphous alloy ribbon are also referred to as "group of irradiation mark rows".

The latter group of plural rows has plural such groups of irradiation mark rows present in the in the width direction of the ribbon, the respective positions of the laser irradiation mark rows in plural such groups need not to be located on the same line in the width direction and may be in a positional relationship in which the laser irradiation mark rows are each displaced in the casting direction. For example, in a case in which two such groups of irradiation mark rows are present in the width direction of the ribbon, the two groups may be in a positional relationship in which the groups are isolated by a region with no irradiation mark rows formed in the middle section in the width direction of the ribbon and plural laser irradiation mark rows arranged in one of the groups and plural laser irradiation mark rows arranged in another of the groups are alternately present each other with being displaced at a constant distance in the casting direction.

The line interval in the disclosure is a value determined as follows.

In a case in which plural laser irradiation mark rows arranged in the casting direction are included as the group of single row having a single row in the "middle section in the width direction" as in (1) described above, the line interval can be determined as an average value of measurement values obtained by measuring the interval between mutually adjacent two laser irradiation mark rows in the casting direction in the group of single row at five points arbitrarily selected. In such a case, such plural laser irradiation mark rows configuring the group of single row are preferably present at a constant interval, and may be present at any interval.

In a case in which plural laser irradiation mark rows arranged in the casting direction are included as the group of plural rows, including plural rows, in the "middle section in the width direction" as in (2) described above, the line interval can be determined as a value obtained by further averaging the values (average values) determined with respect to respective "groups of irradiation mark rows" in the group of plural rows by the same method as the above procedure. In such a case, such plural laser irradiation mark rows configuring such each "group of irradiation mark rows" are preferably present at a constant interval, and may be present at any interval.

The Fe-based amorphous alloy ribbon of the disclosure has a spot interval of from 0.10 mm to 0.50 mm in a case in which the spot interval is defined as an interval between center points of plural laser irradiation marks in each of plural laser irradiation mark rows. Accordingly, spots continuously formed at a spot interval of less than 0.1 mm are not included.

In a case in which a spot interval of 0.10 mm or more, an increase in exciting power measured in a condition of a magnetic flux density of 1.45 T is suppressed as compared with the case of a spot interval of less than 0.10 mm (see FIG. 2 described above).

In a case in which a spot interval of 0.50 mm or less, the effect of a reduction in iron loss measured in a condition of a magnetic flux density of 1.45 T is excellent as compared with the case of a spot interval of more than 0.50 mm.

The spot interval is preferably from 0.15 mm to 0.40 mm, more preferably from 0.20 mm to 0.40 mm.

As described above, the Fe-based amorphous alloy ribbon of the disclosure is more decreased in the number density of laser irradiation marks configuring each of laser irradiation mark rows, as compared with conventional one, and thus is suppressed in an increase in exciting power measured in a condition of a magnetic flux density of 1.45 T.

The number density D of the laser irradiation marks in the Fe-based amorphous alloy ribbon of the disclosure is a value calculated by the following Formula in a case in which the line interval is designated as d1 (mm) and the spot interval is designated as d2 (mm).

$$D=(1/d1)\times(1/d2)$$

The number density D is a value calculated from the line interval and the spot interval, and represents the density of the laser irradiation marks formed. In other words, a number density (D) satisfying $d1\times d2\times D=1$ in a unit area ($mm^2$) having certain line interval and spot interval is from 0.05 marks/$mm^2$ to 0.50 marks/$mm^2$. In such a case, the unit area is calculated from an area of a region in which the laser irradiation mark rows are formed in the width direction of the Fe-based amorphous alloy ribbon, and which has a length of 1 m in the casting direction or a length equal to an entire length in the casting direction when the length in the casting direction is less than 1 m.

The number density D of the laser irradiation marks is a proper value (value lower than conventional one), whereby an increase in exciting power measured in a condition of a magnetic flux density of 1.45 T can be suppressed.

The number density D of the laser irradiation marks configuring each of the laser irradiation mark rows is from 0.05 marks/$mm^2$ to 0.50 marks/$mm^2$.

In a case in which the number density D of the laser irradiation marks configuring each of the laser irradiation mark rows is 0.05 marks/$mm^2$ or more, the effect of a reduction in iron loss measured in a condition of a magnetic flux density of 1.45 T is more excellent.

In a case in which the number density D of the laser irradiation marks configuring each of the laser irradiation mark rows is 0.50 marks/$mm^2$ or less, the effect of suppression of an increase in exciting power measured in a condition of a magnetic flux density of 1.45 T is more effectively exerted.

The number density D of the laser irradiation marks configuring each of the laser irradiation mark rows is more preferably from 0.10 marks/$mm^2$ to 0.50 marks/$mm^2$.

In a case in which plural the laser irradiation mark rows in the disclosure are present, the number density D can be determined as follows, depending on the case.

In a case in which plural laser irradiation mark rows arranged in the casting direction are included as the group of single row having a single row in the "middle section in the width direction" as in (1) described above, the number density D is determined as the number density D by the above Formula, from the average value with respect to the line interval and the average value with respect to the spot interval determined by arbitrarily selecting five locations of "mutually adjacent laser irradiation mark rows" from plural laser irradiation mark rows, configuring the group of single row, and measuring line intervals and spot intervals to determine the respective average values. The number density D determined is in a range of from 0.05 marks/$mm^2$ to 0.50 marks/$mm^2$, whereby the effects of the invention are exerted.

In a case in which plural laser irradiation mark rows arranged in the casting direction are included as the group of plural rows, including plural rows, in the "middle section in the width direction" as in (2) described above, the number density D is determined with respect to each "group of irradiation mark rows" in the group of plural rows by the same method as the above procedure. The number density D in at least one "group of irradiation mark rows" in the group of plural rows, among such number densities D determined, is in a range of from 0.05 marks/$mm^2$ to 0.50 marks/$mm^2$, thereby allowing the effects to be exerted, and the average value of such number densities D determined is preferably in a range of from 0.05 marks/$mm^2$ to 0.50 marks/$mm^2$ and the number densities D in all the "groups of irradiation mark rows" in the group of plural rows are each more preferably in a range of from 0.05 marks/$mm^2$ to 0.50 marks/$mm^2$, from the viewpoint that the effects of the invention are more exerted.

The "casting direction" is here a direction corresponding to a circumferential direction of a cooling roll used in casting of the Fe-based amorphous alloy ribbon, and in other words, a direction corresponding to the longitudinal direction of the Fe-based amorphous alloy ribbon after casting and before cutting.

A ribbon piece cut out can also be here confirmed about which direction the "casting direction" corresponds to, by observing the free solidified surface and/or the roll contact surface of the ribbon piece. For example, a thin stripe along with the casting direction is observed on the free solidified surface and/or the roll contact surface of the ribbon piece. The direction orthogonal to the casting direction is the width direction.

It is preferable that the proportion of the length in the width direction of the laser irradiation mark rows in the entire length in the width direction of the Fe-based amorphous alloy ribbon is from 10% to 50% in each direction from the center in the width direction toward both ends in the width direction. Herein, "%" is defined under the assumption that the entire length in the width direction of the Fe-based amorphous alloy ribbon is 100%.

In a case in which the direction of the laser irradiation mark rows is inclined to the width direction, the length of the laser irradiation mark rows is defined as not the length of the laser irradiation mark rows themselves inclined, but a value obtained by conversion into the length in the width direction of the ribbon, of a portion in which the laser irradiation mark rows are formed.

A proportion of the length, of 50%, means that the laser irradiation mark rows reach one end and other end in the width direction with the middle in the width direction of the Fe-based amorphous alloy ribbon, as a point of origin. The phrase "reach one end and other end in the width direction with the middle in the width direction of the Fe-based amorphous alloy ribbon, as a point of origin" means that the interval between any laser irradiation mark at an end of the laser irradiation mark rows and an end portion of the Fe-based amorphous alloy ribbon is equal to or less than the spot interval of the laser irradiation mark rows at both one end and other end.

For example, in a case in which the direction of the laser irradiation mark rows and the width direction of the Fe-based amorphous alloy ribbon are parallel, the entire length in the direction of the laser irradiation mark rows of the Fe-based amorphous alloy ribbon corresponds to the entire width of the Fe-based amorphous alloy ribbon.

A proportion of the length, of 10%, means that the length from the center in the width direction toward each of both ends in the width direction is 10%, in other words, means that laser irradiation mark rows having a length of 20% of the width length are included as a center region in the entire width. In other words, it is meant that laser irradiation mark rows are formed with any blank space being left by 40% with respect to the entire length in the width direction at both ends in the width direction of the Fe-based amorphous alloy ribbon.

The proportion of the length in the width direction of the laser irradiation mark rows in the entire length in the width direction of the laser irradiation mark rows of the Fe-based amorphous alloy ribbon is more preferably 25% or more in each direction from the center in the width direction toward both ends in the width direction.

The laser irradiation mark rows are still more preferably formed in six middle regions in the width direction that are regions other than two regions at both ends of eight regions obtained by equally dividing the Fe-based amorphous alloy ribbon into eight parts in the width direction.

<Roughness of Free Solidified Surface (Maximum Cross-sectional Height Rt)>

As described in, for example, WO 2012/102379 above, a reduction in iron loss has been conventionally made by providing wavy irregularities on a free solidified surface.

However, it has been found according to studies of the inventors that wavy irregularities may sometimes cause an increase in exciting power measured in a condition of a magnetic flux density of 1.45 T.

Accordingly, wavy irregularities are preferably reduced as much as possible from the viewpoint that an increase in exciting power measured in a condition of a magnetic flux density of 1.45 T is suppressed.

Specifically, the maximum cross-sectional height Rt on the free solidified surface excluding plural laser irradiation mark rows is preferably 3.0 μm or less.

A maximum cross-sectional height Rt of 3.0 μm or less means that no wavy irregularities are present on the free solidified surface or wavy irregularities are reduced.

Herein, the maximum cross-sectional height Rt on the free solidified surface excluding plural laser irradiation mark rows is obtained by subjecting a portion of the free solidified surface, the portion excluding plural laser irradiation mark rows, to measurement (evaluation) at an evaluation length of 4.0 mm and a cut-off value of 0.8 mm with a cut-off type as 2RC (phase compensation) according to JIS B 0601:2001. The direction of the evaluation length is here defined as the casting direction of the Fe-based amorphous alloy ribbon. The above measurement at an evaluation length of 4.0 mm is performed by performing the measurement particularly at a cut-off value of 0.8 mm continuously five times.

The maximum cross-sectional height Rt on the free solidified surface excluding plural laser irradiation mark rows is more preferably 2.5 μm or less.

The lower limit of the maximum cross-sectional height Rt is not particularly limited, and the lower limit of the maximum cross-sectional height Rt is preferably 0.8 μm, more preferably 1.0 μm from the viewpoint of production suitability of the Fe-based amorphous alloy ribbon.

<Chemical Composition>

The chemical composition of the Fe-based amorphous alloy ribbon of the disclosure is not particularly limited, and may be a chemical composition (namely, any chemical composition with Fe (iron) as a main component) of an Fe-based amorphous alloy.

The chemical composition of the Fe-based amorphous alloy ribbon of the disclosure is here preferably the following chemical composition A from the viewpoint that the effects of the Fe-based amorphous alloy ribbon of the disclosure are more effectively obtained.

A chemical composition A as a preferable chemical composition is a chemical composition consisting of Fe, Si, B, and impurities, in which a content of Fe is 78 atom % or more, a content of B is 11 atom % or more, and a total content of B and Si is from 17 atom % to 22 atom % in a case in which a total content of Fe, Si, and B is 100 atom %.

Hereinafter, the chemical composition A will be described in more detail.

The content of Fe in the chemical composition A is 78 atom % or more.

Fe (iron) is one of transition metals highest in magnetic moment even in an amorphous structure, and serves as a bearer of magnetic properties in an Fe—Si—B-based amorphous alloy.

In a case in which the content of Fe is 78 atom % or more, the saturated magnetic flux density (Bs) of the Fe-based amorphous alloy ribbon can be increased (for example, a Bs of about 1.6 T can be realized). A preferable magnetic flux density B0.1 (1.52 T or more) described below is also easily achieved.

The content of Fe is preferably 80 atom % or more, still more preferably 80.5 atom % or more, still more preferably 81.0 atom % or more. The content is also preferably 82.5 atom % or less, still more preferably 82.0 atom % or less.

The content of B in the chemical composition A is 11 atom % or more.

B (boron) is an element contributing to amorphous formation. In a case in which the content of B is 11 atom % or more, amorphous formation ability is more enhanced.

In a case in which the content of B is 11 atom % or more, a magnetic domain is easily oriented in the casting direction, and the magnetic domain width is increased, whereby the magnetic flux density (B0.1) is easily enhanced.

The content of B is preferably 12 atom % or more, still more preferably 13 atom % or more.

The upper limit of the content of B is preferably 16 atom %, while depending on the total content of B and Si described below.

The total content of B and Si in the chemical composition A is from 17 atom % to 22 atom %.

Si (silicon) is an element which is segregated, in the form of a molten metal, on a surface and thus has the effect of preventing oxidation of a molten metal. Si is also an element which acts as an aid for amorphous formation and thus has the effect of an increase in glass transition temperature, and which allows for formation of a more thermally stable amorphous phase.

In a case in which the total content of B and Si is 17 atom % or more, the above effect of Si is effectively exerted.

In a case in which the total content of B and Si is 22 atom % or less, a large amount of Fe serving as a bearer can be ensured, and such a case is advantageous in terms of an enhancement in saturated magnetic flux density Bs and an enhancement in magnetic flux density BOA.

The content of Si is preferably 2.0 atom % or more, more preferably 2.4 atom % or more, still more preferably 3.5 atom % or more.

The upper limit of the content of Si is preferably 6.0 atom %, while depending on the total content of B and Si.

A more preferable chemical composition as the above chemical composition A of the Fe-based amorphous alloy ribbon consists of Fe, Si, B, and impurities, from the viewpoint of more improvements in iron loss and exciting power described below, in which the content of Fe is 80 atom % or more, the content of B is 12 atom % or more, and the total content of B and Si is from 17 atom % to 20 atom % in a case in which a total content of Fe, Si, and B is 100 atom %.

The chemical composition A contains impurities.

In such a case, the chemical composition A may contain one or more impurities.

Examples of such impurities include any elements other than Fe, Si, and B, and specific examples include C, Ni, Co, Mn, O, S, P, Al, Ge, Ga, Be, Ti, Zr, Hf, V, Nb, Ta, Cr, Mo, and rare-earth elements.

Such element(s) can be contained in a total amount range of 1.5% by mass with respect to the total mass of Fe, Si, and B. The upper limit of the total content of such element(s) is preferably 1.0% by mass or less, still more preferably 0.8% by mass or less, still more preferably 0.75% by mass or less. Such element(s) may be added in such any range.

<Thickness>

The thickness of the Fe-based amorphous alloy ribbon of the disclosure is not particularly limited, and the thickness is preferably from 20 μm to 35 μm.

A thickness of 20 μm or more is advantageous in terms of suppression of waviness of the Fe-based amorphous alloy ribbon and then an enhancement in lamination factor.

A thickness of 35 μm or less is advantageous in terms of embrittlement suppression and magnetic saturation properties of the Fe-based amorphous alloy ribbon.

The thickness of the Fe-based amorphous alloy ribbon is more preferably from 20 μm to 30 μm.

<Iron Loss>

As described above, the Fe-based amorphous alloy ribbon of the disclosure is reduced in iron loss under conditions of a frequency of 60 Hz and a magnetic flux density of 1.45 T by segmentalization of a magnetic domain with laser processing (formation of laser irradiation marks).

The iron loss under conditions of a frequency of 60 Hz and a magnetic flux density of 1.45 T is preferably 0.160 W/kg or less, more preferably 0.150 W/kg or less, still more preferably 0.140 W/kg or less, still more preferably 0.130 W/kg or less.

The lower limit of the iron loss under conditions of a frequency of 60 Hz and a magnetic flux density of 1.45 T is not particularly limited, and the lower limit of the iron loss is preferably 0.050 W/kg from the viewpoint of production suitability of the Fe-based amorphous alloy ribbon.

The iron loss of the Fe-based amorphous alloy ribbon is measured according to JIS 7152 (version in 1996).

<Exciting Power>

As described above, the Fe-based amorphous alloy ribbon of the disclosure is suppressed in an increase in exciting power in a condition of a magnetic flux density of 1.45 T.

The exciting power under conditions of a frequency of 60 Hz and a magnetic flux density of 1.45 T is preferably 0.200 VA/kg or less, more preferably 0.170 VA/kg or less, still more preferably 0.165 VA/kg or less.

The lower limit of the exciting power under conditions of a frequency of 60 Hz and a magnetic flux density of 1.45 is not particularly limited, and the lower limit of the exciting power is preferably 0.100 VA/kg from the viewpoint of production suitability of the Fe-based amorphous alloy ribbon.

<Magnetic Flux Density B0.1>

As described above, the Fe-based amorphous alloy ribbon of the disclosure is suppressed in an increase in exciting power in a condition of a magnetic flux density of 1.45 T and thus is suppressed in a reduction in magnetic flux density B0.1 according to an increase in exciting power, and as a result, the magnetic flux density B0.1 can be kept high.

The magnetic flux density B0.1 under conditions of a frequency of 60 Hz and a magnetic field of 7.9557 A/m in the Fe-based amorphous alloy ribbon of the disclosure is preferably 1.52 T or more.

The upper limit of the magnetic flux density B0.1 under conditions of a frequency of 60 Hz and a magnetic field of 7.9557 A/m is not particularly limited, and the upper limit is preferably 1.62 T.

<Ratio [Operating Magnetic Flux Density Bm/Saturated Magnetic Flux Density Bs]>

As described above, the Fe-based amorphous alloy ribbon of the disclosure can be suppressed to low iron loss and exciting power in a condition of a magnetic flux density of 1.45 T which is a higher magnetic flux density than a magnetic flux density of 1.3 T as a conventional condition.

Thus, the iron loss and the exciting power can be suppressed even in the case of use at an operating magnetic flux density Bm where the ratio [operating magnetic flux density Bin/saturated magnetic flux density Bs] (hereinafter, also referred to as "Bin/Bs ratio") is in a condition higher than conventional one.

In this regard, an Fe-based amorphous alloy ribbon according to conventional one example has been used under conditions of a saturated magnetic flux density Bs of 1.56 T and an operating magnetic flux density Bm of 1.35 T (namely, Bm/Bs ratio=0.87) (see, for example, IEEE TRANSACTIONS ON MAGNETICS Vol. 44, No. 11, November 2008, pp. 4104-4106 (in particular, p. 4106)).

The Fe-based amorphous alloy ribbon of the disclosure, on the contrary, is, for example, an Fe-based amorphous alloy ribbon having a chemical composition ($Fe_{82}Si_4$ $B_{14}$) according to Example described below and having a Bs of 1.63 T. The Bs is almost unambiguously determined by the chemical composition. The Fe-based amorphous alloy ribbon of the disclosure can be here used at a Bm of 1.43 T or more (preferably from 1.45 T to 1.50 T). The Bm/Bs ratio is 0.88 in the case of a Bm of 1.43 T, and the Bm/Bs ratio is 0.92 in the case of a Bm of 1.50 T.

For the reasons stated above, the Fe-based amorphous alloy ribbon of the disclosure is particularly suitable for an application for use at an operating magnetic flux density Bm, in which a Bm/Bs ratio is from 0.88 to 0.94 (preferably from 0.89 to 0.92).

The Fe-based amorphous alloy ribbon of the disclosure can also be suppressed in increases in iron loss and exciting power even in the case of use at an operating magnetic flux density Bm, in which a Bm/Bs ratio is from 0.88 to 0.94 (preferably from 0.89 to 0.92).

Method of Producing Fe-based Amorphous Alloy Ribbon (Production Method X)

The Fe-based amorphous alloy ribbon of the disclosure can be preferably produced by the following production method X.

The production method X includes a step of preparing a material ribbon including an Fe-based amorphous alloy and having a free solidified surface and a roll contact surface (hereinafter, also referred to as "material preparation step"), and a step of forming plural laser irradiation mark rows each configured from plural laser irradiation marks on at least one surface of the free solidified surface or the roll contact surface of the material ribbon, by laser processing, thereby obtaining an Fe-based amorphous alloy ribbon having plural laser irradiation mark rows (hereinafter, also referred to as "laser processing step"), in which the Fe-based amorphous alloy ribbon has:

a line interval of from 10 mm to 60 mm, the line interval being defined as a centerline interval in a middle section in a width direction, between mutually adjacent laser irradiation mark rows of plural such laser irradiation mark rows arranged in the casting direction of the Fe-based amorphous alloy ribbon, the width direction being orthogonal to the casting direction, a spot interval of from 0.10 mm to 0.50 mm, the spot interval being defined as an interval between center points of the plural laser irradiation marks in each of the plural laser irradiation mark rows, and a number density D of the laser irradiation marks of from 0.05 marks/mm$^2$ to 0.50 marks/mm$^2$, provided that the line interval is d1 (mm), the spot interval is d2 (mm), and the number density D of the laser irradiation marks is $D=(1/d1)\times(1/d2)$.

The production method X may have, if necessary, any step other than the material preparation step and the laser processing step.

Material Preparation Step

The material preparation step in the production method X is a step of preparing a material ribbon having a free solidified surface and a roll contact surface.

The material ribbon here mentioned may be a ribbon not cut after casting (for example, a rolled article wound up in the form of a roll after casting) or may be a ribbon piece cut out to a desired size after casting.

The material ribbon is, per se, the Fe-based amorphous alloy ribbon of the disclosure before formation of laser irradiation marks.

The free solidified surface and the roll contact surface of the material ribbon have the respective same meanings as the free solidified surface and the roll contact surface of the Fe-based amorphous alloy ribbon of the disclosure.

A preferable aspect of the material ribbon (for example, a preferable chemical composition, a preferable Rt) is the same as a preferable aspect of the Fe-based amorphous alloy ribbon of the disclosure, except for the presence or absence of laser irradiation marks.

The material preparation step may be a step of merely preparing such a material ribbon cast in advance (namely, already completed) for the purpose of subjecting to the laser processing step, or may be a step of newly casting such a material ribbon.

The material preparation step may also be a step of performing at least one of casting of the material ribbon or cutting out of a ribbon piece from the material ribbon.

Laser Processing Step

The laser processing step in the production method X forms plural laser irradiation marks (particularly, each laser irradiation mark row configured from plural laser irradiation marks) on at least one surface of the free solidified surface or the roll contact surface of the material ribbon, by laser processing (namely, by laser irradiation).

A preferable aspect of the laser irradiation marks and laser irradiation mark rows formed in the laser irradiation step (preferable line interval, spot interval, number density of the laser irradiation marks, and the like) is the same as a preferable aspect of the laser irradiation marks and laser irradiation mark rows in the Fe-based amorphous alloy ribbon of the disclosure.

As described above, the effect of a reduction in iron loss by laser irradiation is obtained as long as each of plural laser irradiation marks corresponds to any mark to which energy is applied by laser irradiation.

Accordingly, the laser conditions in the laser processing step are not particularly limited and are preferably as follows.

The irradiation energy of a laser beam can be controlled with respect to the thickness of the Fe-based amorphous alloy ribbon, thereby allowing the diameter of a depressed portion and the depth of a depressed portion to be controlled.

The pulse energy of laser for formation of each laser irradiation mark in the laser processing step (hereinafter, also referred to as "laser pulse energy") is preferably from 0.4 mJ to 2.5 mJ, more preferably from 0.6 mJ to 2.5 mJ, still more preferably from 0.8 mJ to 2.5 mJ, still more preferably from 1.0 mJ to 2.0 mJ, still more preferably from 1.3 mJ to 1.8 mJ.

The diameter of a laser beam (hereinafter, also referred to as "spot diameter") is from 50 μm to 200 μm.

In a case in which a value obtained by dividing the laser pulse energy by a spot area is defined as the energy density of laser, the energy density is preferably from 0.01 J/mm$^2$ to 1.50 J/mm$^2$, more preferably from 0.02 J/mm$^2$ to 1.30 J/mm$^2$, still more preferably from 0.03 J/mm$^2$ to 1.02 J/mm$^2$.

The pulse width of laser is preferably 50 nsec or more, more preferably 100 nsec or more. The pulse width falls within the range, whereby magnetic characteristics, for example, the iron loss of a ribbon piece on which laser irradiation marks are formed, can be efficiently improved.

The pulse width refers to a time during which laser irradiation is made, and a small pulse width means a short irradiation time. In other words, the entire energy of a laser beam for irradiation is represented by the product of the energy per unit time and the pulse width.

A laser treatment is made by irradiation with a pulse laser beam scanned in the width direction of the ribbon in formation of a depressed portion.

A laser beam source here used can be YAG laser, CO, gas laser, fiber laser, or the like. In particular, fiber laser is preferable in that irradiation with a high-power and high-frequency pulse laser beam can be stably made for a long time. Fiber laser allows a laser beam introduced into fibers to oscillate with diffraction gratings at both ends of the fibers by the principle of FBG (Fiber Bragg grating). Such a laser beam is excited in elongated fibers, and thus has no problem of the thermal lens effect due to deterioration in beam quality by the temperature gradient generated in crystals. Such a laser beam not only propagates in a single mode even at a high power, but also is narrowed down in beam diameter, due to a fiber core which is as thin as several microns, whereby a high-energy density laser beam is obtained. Such a laser beam is furthermore long in focus depth, and thus enables a depressed portion row to be accurately formed even on a wide ribbon of 200 mm or more. The pulse width of fiber laser is usually about microseconds to picoseconds.

The laser beam wavelength is from about 250 nm to 1100 nm due to a laser beam source, and is suitably a wavelength of from 900 to 1100 nm because sufficient absorption is made in the alloy ribbon.

The laser beam diameter is preferably 10 μm or more, more preferably 30 μm or more, more preferably 50 μm or more. The beam diameter is preferably 500 μm or less, more preferably 400 μm or less, more preferably 300 μm or less.

The laser processing step may be a step of subjecting the material ribbon after casting by a single roll method and before winding up, to laser processing, may be a step of subjecting the material ribbon wound out from the material ribbon wound up (rolled article), to laser processing, or may be a step of subjecting a ribbon piece cut out from the material ribbon wound out from the material ribbon wound up (rolled article), to laser processing.

In a case in which the laser processing step is a step of subjecting the material ribbon after casting by a single roll method and before winding up, to laser processing, the production method X is performed by using, for example, a system in which a laser processing apparatus is disposed between a cooling roll and a wind-up roll.

[Iron Core]

The iron core of the disclosure is formed by layering plural the above-mentioned Fe-based amorphous alloy ribbons of the disclosure, specifically, by layering such Fe-based amorphous alloy ribbons, and bending and winding such Fe-based amorphous alloy ribbons layered in an overlapping manner, and the iron loss under conditions of a frequency of 60 Hz and a magnetic flux density of 1.45 T is 0.250 W/kg or less. The iron loss is preferably 0.230 W/kg or less, more preferably 0.200 W/kg or less, still more preferably 0.180 W/kg or less.

The lower limit of the iron loss under conditions of a frequency of 60 Hz and a magnetic flux density of 1.45 T is not particularly limited, and the lower limit of the iron loss is preferably 0.050 W/kg, more preferably 0.080 W/kg from the viewpoint of production suitability of the Fe-based amorphous alloy ribbon.

The detail of the Fe-based amorphous alloy ribbon of the disclosure is as described above, and the description thereof is omitted.

A known method can be applied to the method of winding in an overlapping manner.

The shape of the iron core of the disclosure may be any of a round shape, a rectangular shape, or the like.

The type or the like of a coil wound around the iron core is not limited, and may be appropriately selected from those known.

[Transformer]

The transformer of the disclosure includes an iron core using the above-mentioned Fe-based amorphous alloy ribbon of the disclosure, and a coil wound around the iron core, in which the iron core is formed by bending and winding the Fe-based amorphous alloy ribbon layered in an overlapping manner, and the iron loss under conditions of a frequency of 60 Hz and a magnetic flux density of 1.45 T is in a range of 0.250 W/kg or less.

The details of the Fe-based amorphous alloy ribbon and the iron core of the disclosure are as described above, and the description thereof is omitted.

The iron loss under conditions of a frequency of 60 Hz and a magnetic flux density of 1.45 T in the transformer of the disclosure is 0.250 W/kg or less, preferably 0.230 W/kg or less, more preferably 0.200 W/kg or less, still more preferably 0.180 W/kg or less.

The lower limit of the iron loss under conditions of a frequency of 60 Hz and a magnetic flux density of 1.45 T is not particularly limited, and the lower limit of the iron loss is preferably 0.050 W/kg, more preferably 0.080 W/kg from the viewpoint of production suitability of the Fe-based amorphous alloy ribbon.

Measurement of the iron loss in the transformer of the disclosure, provided with the Fe-based amorphous alloy ribbon overlapped and wound, is described below in Examples.

The shape of the iron core in the transformer of the disclosure may be any of a round shape, a rectangular shape, or the like. The type or the like of a coil wound around the iron core is not limited, and may be appropriately selected from those known.

EXAMPLES

Hereinafter, Examples will be described as embodiments of the Fe-based amorphous alloy ribbon and the transformer of the disclosure. The disclosure is not here limited to the following Examples.

Example 1

<Production of Material Ribbon (Fe-based Amorphous Alloy Ribbon Before Laser Processing)>

A material ribbon (namely, Fe-based amorphous alloy ribbon before laser processing) having a chemical composition of $Fe_{82}Si_4B_{14}$ and having a thickness of 25 μm and a width of 210 mm was produced by a single roll method.

The "chemical composition of $Fe_{82}Si_4B_{14}$" here means a chemical composition which consists of Fe, Si, B, and impurities and in which the content of Fe is 82 atom %, the content of B is 14 atom %, and the content of B is 4 atom % in a case in which the total content of Fe, Si, and B is 100 atom %.

Hereinafter, production of the material ribbon will be described in detail.

The material ribbon was produced by retaining a molten metal having a chemical composition of $Fe_{82}Si_4B_{14}$, at a temperature of 1300° C., next ejecting the molten metal through a slit nozzle onto a surface of an axially rotating cooling roll, and rapidly solidifying the molten metal ejected, on the surface of the cooling roll.

The ambient atmosphere immediately under the slit nozzle, in which a paddle of the molten metal was to be formed, on the surface of the cooling roll was a non-oxidative gas atmosphere.

The slit length and the slit width of the slit nozzle were 210 mm and 0.6 mm, respectively.

The material of the cooling roll was a Cu-based alloy, and the circumferential velocity of the cooling roll was 27 m/s.

The pressure, at which the molten metal was ejected, and the nozzle gap (namely, the gap between the tip of the slit nozzle and the surface of the cooling roll) were adjusted so that the maximum cross-sectional height Rt (specifically, the maximum cross-sectional height Rt measured along with the casting direction of the material ribbon) on the free solidified surface of the material ribbon produced was 3.0 μm or less.

<Laser Processing>

A sample piece was cut out from the material ribbon, and the sample piece cut out was subjected to laser processing, thereby obtaining an Fe-based amorphous alloy ribbon piece laser-processed.

Hereinafter, the detail will be described.

Figure 3:
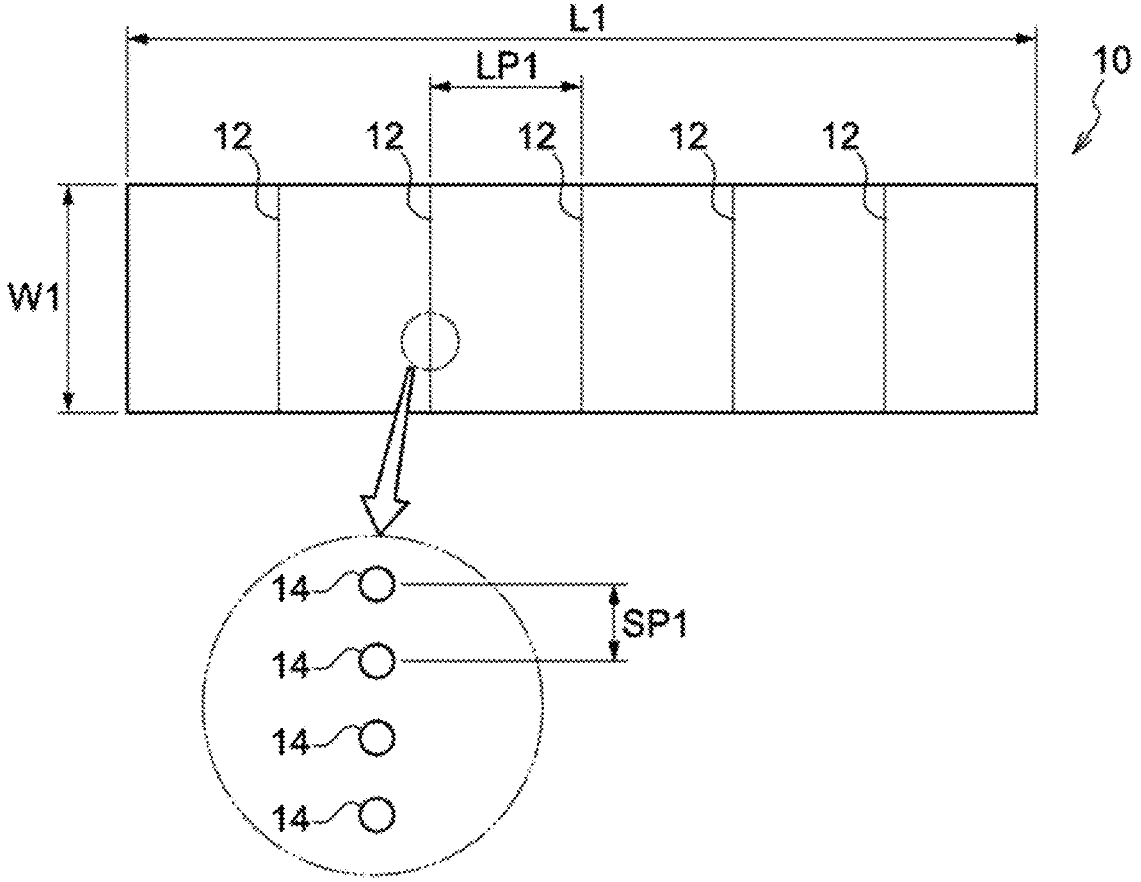
FIG. 3 is a schematic plan view schematically illustrating a free solidified surface of an Fe-based amorphous alloy ribbon piece laser-processed in Example 1.

FIG. 3 is a schematic plan view schematically illustrating a free solidified surface of an Fe-based amorphous alloy ribbon piece laser-processed (ribbon 10).

The length L1 (namely, the length of the sample piece cut out from the material ribbon) of the ribbon 10 illustrated in FIG. 3 was 120 mm, and the width W1 (namely, the width of the sample piece cut out from the material ribbon) of the ribbon 10 was 25 mm. The sample piece was cut out in an orientation so that the length direction of the sample piece and the length direction of the material ribbon were matched and the width direction of the sample piece and the width direction of the material ribbon were matched.

The free solidified surface of the sample piece cut out was irradiated with pulsed laser, whereby plural laser irradiation mark rows 12 each configured from plural laser irradiation marks 14 were formed and thus the ribbon 10 was obtained.

Particularly, the plural laser irradiation marks 14 were formed on the free solidified surface of the sample piece (ribbon 10 before laser processing, the same shall apply hereinafter.) in line in a direction parallel to the width direction of the sample piece, whereby the laser irradiation mark rows 12 were formed. The laser irradiation mark rows 12 were formed in the entire region in the width direction of the sample piece. In other words, the length of the laser irradiation mark rows in the width direction of the sample piece was set to be 100% with respect to the entire width of the sample piece.

The laser irradiation mark rows 12 were formed in plural rows. The directions of such plural the laser irradiation mark rows 12 were parallel.

The spot interval SP1 in the laser irradiation mark rows 12 (namely, interval between center points of the plural laser irradiation marks 14) and the line interval LP1 (namely, centerline interval between the plural laser irradiation mark rows 12) were as shown in Table 1.

The number density (marks/mm$^2$) of the laser irradiation marks in the ribbon 10 was as shown in Table 1. The number density D of the laser irradiation marks (marks/mm$^2$) was calculated by the following Formula.

$$D=(1/d1)\times(1/d2)$$

In Formula, d1 represented the line interval (unit: mm) and d2 represented the spot interval (unit: mm).

The processing conditions of the pulsed laser were as follows.

Processing Conditions of Pulsed Laser

A laser oscillator used was pulse fiber laser (YLP-HP-2-A30-50-100) from IPG Photonics. The laser medium of the laser oscillator was a glass fiber doped with Yb, and the oscillation wavelength was 1064 nm.

The outgoing beam diameter through a collimator at a fiber end of the laser oscillator was 6.2 mm.

The laser spot diameter on the free solidified surface of the sample piece was adjusted to 60.8 μm. The beam diameter was adjusted using a beam expander (BE) as an optical component and a condenser lens (focal length 254 mm) (fθ: f254 mm).

The beam mode M2 was 3.3 (multimode).

The laser pulse energy was 2.0 mJ, and the laser pulse width was 250 nsec.

The magnification of beam by BE was 3 times, and the Focus was 0 mm.

The Focus here means the difference (absolute value) between the focal length (254 mm) of the condenser lens and the actual distance from the condenser lens to the free solidified surface of the ribbon.

The incident diameter D and the spot diameter $D_0$ satisfy a relationship of $D_0=4\lambda f/\pi D$ (where λ represents the laser wavelength and f represents the focal length), and thus the spot diameter $D_0$ tends to be decreased as the beam magnification BE is increased (namely, as the incident diameter D is increased).

In a case in which the value obtained by dividing the laser pulse energy (2.0 mJ) by the laser beam diameter (60.8 μm) on the free solidified surface of the sample piece was defined as the energy density in the processing conditions, the energy density was 0.689 J/mm$^2$ expressed in unit of J/mm$^2$.

The energy density (0.689 J/mm$^2$) is shown in Table 4.

<Measurement and Evaluation>

The Fe-based amorphous alloy ribbon laser-processed (ribbon 10 in FIG. 3) was subjected to the following measurement and evaluation. The results are shown in Table 1.

(Maximum Cross-sectional Height Rt in Non-laser-processed Region)

The maximum cross-sectional height Rt with respect to a portion of the free solidified surface of the Fe-based amorphous alloy ribbon laser-processed, the portion (namely, non-laser-processed region) being other than the laser irradiation mark rows 12, was measured at an evaluation length of 4.0 mm and a cut-off value of 0.8 mm with a cut-off type as 2RC (phase compensation) according to JIS B 0601:2001. The direction of the evaluation length was set to correspond to the casting direction of the material ribbon. The measurement in which the evaluation length was 4.0 mm was performed particularly continuously at a cut-off value of 0.8 mm five times.

The measurement in which the evaluation length was 4.0 mm was performed at three points in the non-laser-processed region, and the average value of the resulting three measurement values was defined as the maximum cross-sectional height Rt (μm) in the present Example.

(Measurement of Iron Loss CL)

The Fe-based amorphous alloy ribbon laser-processed was subjected to measurement of the iron loss CL by sinusoidal excitation with an AC magnetic measuring instrument in two conditions including a condition of a frequency of 60 Hz and a magnetic flux density of 1.45 T and a condition of a frequency 60 Hz and a magnetic flux density 1.50 T.

(Measurement of Exciting Power VA)

The Fe-based amorphous alloy ribbon laser-processed was subjected to measurement of the exciting power VA by sinusoidal excitation with an AC magnetic measuring instrument in two conditions including a condition of a frequency of 60 Hz and a magnetic flux density of 1.45 T and a condition of a frequency 60 Hz and a magnetic flux density 1.50 T.

(Measurement of Magnetic Flux Density B0.1)

The Fe-based amorphous alloy ribbon laser-processed was subjected to measurement of the magnetic flux density B0.1 under conditions of a frequency of 60 Hz and a magnetic field of 7.9557 A/m.

Comparative Example 1

The same operation as in Example 1 was performed except that no laser processing was performed.

The results are shown in Table 1 to Table 3.

Examples 2 to 14 and Comparative Examples 2 to 4

The same operation as in Example 1 was performed except that each combination of the spot interval and the line interval was changed as shown in Table 1 and Table 2.

While the maximum cross-sectional height Rt was also a different value among these Examples, the maximum cross-sectional height Rt was not intentionally controlled (the same shall apply in Example 15 and later Examples described below). The maximum cross-sectional height Rt was difficult to intentionally control in a range of the maximum cross-sectional height Rt, of 3.0 μm or less.

The results are shown in Table 1 and Table 2.

Comparative Example 5

The same evaluation as in Comparative Example 1 was performed except that the pressure, at which the molten metal was ejected, and the nozzle gap were adjusted so that the maximum cross-sectional height Rt was more than 3.0 μm. The results are shown in Table 2.

Any wavy irregularities were formed on the free solidified surface of the Fe-based amorphous alloy ribbon of Comparative Example 5.

TABLE 1

<Influence of spot interval>

| | Free solidified surface of ribbon | | | | | Magnetic characteristics | | | | |
|---|---|---|---|---|---|---|---|---|---|---|
| | | | Region laser-processed (laser irradiation mark rows) | | Number density of laser irradiation marks (marks/$mm^2$) | | | | | |
| | Region not laser-processed Rt (μm) | Laser pulse energy (mJ) | Spot interval SP1 (mm) | Line interval LP1 (mm) | | Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
| Comparative Example 1 | 1.0 | — | — | — | 0 | 0.168 | 0.183 | 1.51 | 0.176 | 0.244 |
| Comparative Example 2 | 1.0 | 2.0 | 0.05 | 20 | 1.00 | 0.088 | 0.518 | 1.48 | 0.098 | 0.789 |
| Example 1 | 1.6 | 2.0 | 0.10 | 20 | 0.50 | 0.104 | 0.200 | 1.52 | 0.113 | 0.293 |
| Example 2 | 1.2 | 2.0 | 0.15 | 20 | 0.33 | 0.095 | 0.165 | 1.54 | 0.107 | 0.267 |
| Example 3 | 1.1 | 2.0 | 0.20 | 20 | 0.25 | 0.108 | 0.140 | 1.55 | 0.122 | 0.211 |
| Example 4 | 1.3 | 2.0 | 0.25 | 20 | 0.20 | 0.108 | 0.134 | 1.55 | 0.118 | 0.192 |
| Example 5 | 1.5 | 2.0 | 0.30 | 20 | 0.17 | 0.124 | 0.146 | 1.55 | 0.131 | 0.209 |
| Example 6 | 2.4 | 2.0 | 0.40 | 20 | 0.13 | 0.119 | 0.143 | 1.54 | 0.135 | 0.230 |
| Example 7 | 1.6 | 2.0 | 0.45 | 20 | 0.11 | 0.138 | 0.160 | 1.54 | 0.150 | 0.216 |
| Example 8 | 1.3 | 2.0 | 0.50 | 20 | 0.10 | 0.147 | 0.160 | 1.54 | 0.161 | 0.199 |

TABLE 2

<Influence of line interval>

| | Free solidified surface of ribbon | | | | | Magnetic characteristics | | | | |
|---|---|---|---|---|---|---|---|---|---|---|
| | | | Region laser-processed (laser irradiation mark rows) | | Number density of laser irradiation marks (marks/$mm^2$) | | | | | |
| | Region not laser-processed Rt (μm) | Laser pulse energy (mJ) | Spot interval SP1 (mm) | Line interval LP1 (mm) | | Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
| Comparative Example 1 | 1.0 | — | — | — | 0 | 0.168 | 0.183 | 1.51 | 0.176 | 0.244 |
| Example 9 | 1.3 | 2.0 | 0.20 | 60 | 0.08 | 0.146 | 0.170 | 1.52 | 0.168 | 0.238 |

TABLE 2-continued

<Influence of line interval>

| | Free solidified surface of ribbon: Region not laser-processed Rt (μm) | Free solidified surface of ribbon: Laser pulse energy (mJ) | Region laser-processed (laser irradiation mark rows): Spot interval SP1 (mm) | Region laser-processed (laser irradiation mark rows): Line interval LP1 (mm) | Number density of laser irradiation marks (marks/mm²) | Magnetic characteristics: Iron loss CL (W/kg) at 1.45 T 60 Hz | Magnetic characteristics: Exciting power VA (VA/kg) at 1.45 T 60 Hz | Magnetic characteristics: Magnetic flux density B0.1 (T) at 7.9557 A/m 60 Hz | Magnetic characteristics: Iron loss CL (W/kg) at 1.50 T 60 Hz | Magnetic characteristics: Exciting power VA (VA/kg) at 1.50 T 60 Hz |
|---|---|---|---|---|---|---|---|---|---|---|
| Example 10 | 1.7 | 2.0 | 0.20 | 50 | 0.10 | 0.136 | 0.148 | 1.55 | 0.151 | 0.231 |
| Example 11 | 1.4 | 2.0 | 0.20 | 40 | 0.13 | 0.130 | 0.153 | 1.55 | 0.142 | 0.253 |
| Example 12 | 2.0 | 2.0 | 0.20 | 30 | 0.17 | 0.123 | 0.136 | 1.54 | 0.130 | 0.154 |
| Example 3 | 1.1 | 2.0 | 0.20 | 20 | 0.25 | 0.108 | 0.140 | 1.55 | 0.122 | 0.211 |
| Example 13 | 1.4 | 2.0 | 0.20 | 15 | 0.33 | 0.099 | 0.149 | 1.55 | 0.106 | 0.196 |
| Example 14 | 1.2 | 2.0 | 0.20 | 10 | 0.50 | 0.085 | 0.145 | 1.56 | 0.094 | 0.187 |
| Comparative Example 3 | 1.7 | 2.0 | 0.20 | 7.5 | 0.67 | 0.079 | 0.210 | 1.50 | 0.091 | 0.282 |
| Comparative Example 4 | 1.4 | 2.0 | 0.20 | 5 | 1.00 | 0.075 | 0.255 | 1.48 | 0.085 | 0.329 |
| Comparative Example 5 | 3.2 | — | — | — | 0 | 0.101 | 0.214 | 1.51 | 0.117 | 0.316 |

As shown in Table 1 and Table 2, each of the Fe-based amorphous alloy ribbons of Examples 1 to 14, in which the line interval (namely, the centerline interval between the plural laser irradiation mark rows) was from 10 mm to 60 mm, the spot interval (namely, the interval between center points of the plural laser irradiation marks) was from 0.10 mm to 0.50 mm, and the number density D of the laser irradiation marks was from 0.05 marks/mm$^2$ to 0.50 marks/mm$^2$, was reduced in iron loss CL and exciting power VA in a condition of a magnetic flux density of 1.45 T.

On the contrary, the Fe-based amorphous alloy ribbon of Comparative Example 1, in which no laser irradiation mark was formed, was high in iron loss CL.

The Fe-based amorphous alloy ribbon of Comparative Example 2, in which the spot interval was less than 0.10 mm, was high in exciting power VA, although was reduced in iron loss CL.

Each of the Fe-based amorphous alloy ribbons of Comparative Examples 3 and 4, in which the line interval was less than 10 mm, was high in exciting power VA, although was reduced in iron loss CL.

The Fe-based amorphous alloy ribbon of Comparative Example 5, which had no laser irradiation marks and in which the maximum cross-sectional height Rt in the non-laser-processed region on the free solidified surface was more than 3.0 μm, was high in exciting power VA, although was reduced in iron loss CL.

Each of the Fe-based amorphous alloy ribbons of Examples 1 to 14, having a chemical composition of $Fe_{82}Si_4B_{14}$, had a saturated magnetic flux density Bs of 1.63 T.

In Examples 1 to 14, the iron loss CL and the exciting power VA in a condition of a magnetic flux density of 1.45 T corresponded to an example expected for use of an Fe-based amorphous alloy ribbon at an operating magnetic flux density Bm satisfying a ratio [operating magnetic flux density Bm/saturated magnetic flux density Bs] of 0.89 (=1.45/1.63), and the iron loss CL and exciting power VA in a condition of a magnetic flux density of 1.50 T corresponded to an example expected for use of an Fe-based amorphous alloy ribbon at an operating magnetic flux density Bm satisfying a ratio [operating magnetic flux density Bm/saturated magnetic flux density Bs] of 0.92 (=1.50/1.63).

It is expected from the results in Table 1 and Table 2 that the Fe-based amorphous alloy ribbons of Examples 1 to 14 could be suppressed in iron loss and exciting power even in use thereof at an operating magnetic flux density Bm, in which a ratio of operating magnetic flux density Bm/saturated magnetic flux density Bs, is from 0.88 to 0.94.

<Shape of Laser Irradiation Mark>

The shape in planar view of such each laser irradiation mark in each of the Fe-based amorphous alloy ribbons of Examples 1 to 14 was observed by an optical microscope.

As a result, the shape in planar view of such each laser irradiation mark in all the Examples was a coronal shape.

The "coronal shape" here means a shape in which marks due to scattering of the molten alloy remain on an edge portion of such each laser irradiation mark.

Figure 4:
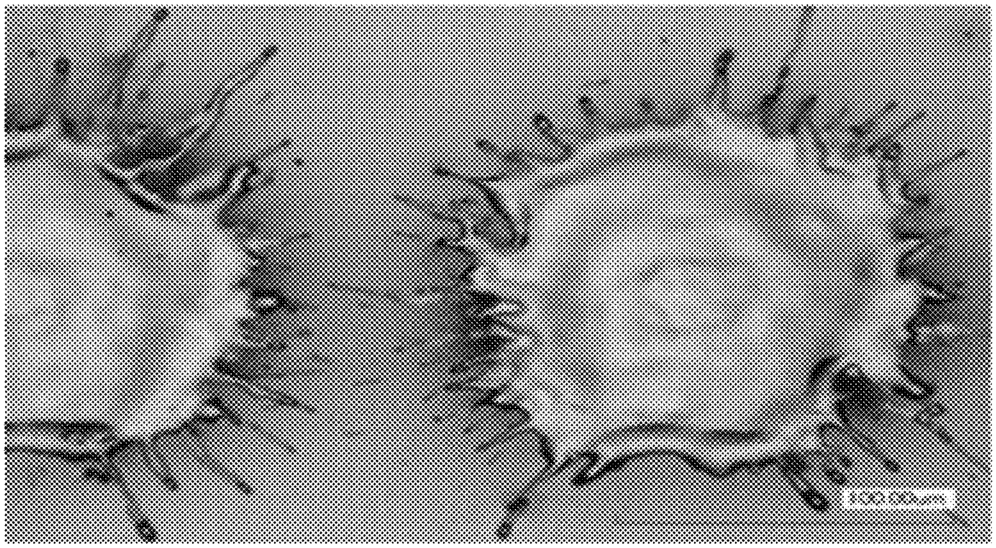
FIG. 4 is an optical micrograph illustrating one example of a coronal laser irradiation mark.

FIG. 4 is an optical micrograph illustrating one example of a coronal laser irradiation mark.

Two coronal laser irradiation marks can be confirmed in FIG. 4. It can be seen that marks due to scattering of the molten alloy remain on an edge portion of such each laser irradiation mark.

Examples 15 to 19

The same operation as in Example 3 was performed except that the laser pulse energy in Example 3 was changed as shown in Table 3. The results are shown in Table 3.

Table 3 shows not only the results in Examples 15 to 19, but also the results in Example 3 and Comparative Example 1 for comparison.

TABLE 3

<Influence of laser pulse energy >

| | Free solidified surface of ribbon: Region not laser-processed Rt (µm) | Laser pulse energy (mJ) | Region laser-processed (laser irradiation mark rows): Spot interval SP1 (mm) | Line interval LP1 (mm) | Number density of laser irradiation marks (marks/mm$^2$) | Magnetic characteristics: Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
|---|---|---|---|---|---|---|---|---|---|---|
| Comparative Example 1 | 1.0 | — | — | — | 0 | 0.168 | 0.183 | 1.51 | 0.176 | 0.244 |
| Example 15 | 2.1 | 0.4 | 0.20 | 20 | 0.25 | 0.154 | 0.173 | 1.53 | 0.162 | 0.244 |
| Example 16 | 1.3 | 0.6 | 0.20 | 20 | 0.25 | 0.138 | 0.159 | 1.55 | 0.149 | 0.235 |
| Example 17 | 1.5 | 0.8 | 0.20 | 20 | 0.25 | 0.125 | 0.151 | 1.54 | 0.139 | 0.230 |
| Example 18 | 1.2 | 1.0 | 0.20 | 20 | 0.25 | 0.120 | 0.132 | 1.55 | 0.136 | 0.219 |
| Example 19 | 1.5 | 1.5 | 0.20 | 20 | 0.25 | 0.112 | 0.131 | 1.56 | 0.119 | 0.199 |
| Example 3 | 1.1 | 2.0 | 0.20 | 20 | 0.25 | 0.108 | 0.140 | 1.55 | 0.122 | 0.211 |

As shown in Table 3, it was confirmed that the effect of a reduction in iron loss was obtained by laser irradiation even in a case in which the laser pulse energy was decreased from 0.4 mJ to 1.5 mJ (Examples 15 to 19). The iron loss CL and the exciting power VA at 60 Hz and 1.45 T were 0.120 W/kg or less and 0.140 or less, respectively, in Examples 18 and 19, and Example 3, in which the laser pulse energy was from 1.0 mJ to 2.0 mJ. The iron loss CL and the exciting power VA at 60 Hz and 1.45 T were 0.112 W/kg and 0.131, respectively, in Example 19, in which the laser pulse energy was from 1.3 mJ to 1.8 mJ (1.5 mJ).

Examples 101 to 105

<Experiment 1 with Respect to Laser Processing Conditions>

The same operation as in Example 3 was performed except that the laser processing conditions (specifically, the magnification of beam by BE and the Focus) were changed as shown in Table 4.

The shape in planar view of such each laser irradiation mark in the Fe-based amorphous alloy ribbon of each Example was observed by an optical microscope. The results are shown in Table 4.

Table 4 shows not only the results in Examples 101 to 105, but also the results in Example 3 and Comparative Example 1 for comparison.

TABLE 4

| | Free solidified surface of ribbon: Region not laser-processed Rt (µm) | Laser processing conditions: BE | Fucus (mm) | Laser pulse energy (mJ) | Spot diameter (µm) | Energy density (J/mm$^2$) | Region laser-processed (laser irradiation mark rows): Spot interval SP1 (mm) | Line interval LP1 (mm) | Number density of laser irradiation marks (marks/mm$^2$) | Shape of laser irradiation mark |
|---|---|---|---|---|---|---|---|---|---|---|
| Comparative Example 1 | 1.0 | — | — | — | — | — | — | — | 0 | — |
| Example 3 | 1.1 | 3x | 0 | 2.0 | 60.8 | 0.689 | 0.20 | 20 | 0.25 | Coronal |
| Example 101 | 1.8 | 3x | 1.5 | 2.0 | 60.8 | 0.689 | 0.20 | 20 | 0.25 | Annular |
| Example 102 | 1.4 | 3x | 2.5 | 2.0 | 60.8 | 0.689 | 0.20 | 20 | 0.25 | Flat |
| Example 103 | 1.7 | 1x | 0 | 2.0 | 182.4 | 0.077 | 0.20 | 20 | 0.25 | Flat |
| Example 104 | 1.2 | 1x | 1.5 | 2.0 | 182.4 | 0.077 | 0.20 | 20 | 0.25 | Annular |
| Example 105 | 1.6 | 1x | 2.5 | 2.0 | 182.4 | 0.077 | 0.20 | 20 | 0.25 | Annular |

TABLE 4-continued

| | Magnetic characteristics | | | | |
|---|---|---|---|---|---|
| | Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
| Comparative Example 1 | 0.168 | 0.183 | 1.51 | 0.176 | 0.244 |
| Example 3 | 0.108 | 0.140 | 1.55 | 0.122 | 0.211 |
| Example 101 | 0.101 | 0.145 | 1.54 | 0.107 | 0.196 |
| Example 102 | 0.102 | 0.143 | 1.55 | 0.112 | 0.223 |
| Example 103 | 0.111 | 0.149 | 1.54 | 0.122 | 0.227 |
| Example 104 | 0.101 | 0.131 | 1.56 | 0.115 | 0.175 |
| Example 105 | 0.102 | 0.158 | 1.55 | 0.115 | 0.249 |

As shown in Table 4, it was found that the shape of such each laser irradiation mark was changed in Examples 101 to 105 in which the laser processing conditions were changed from those in Example 3.

It was also found that the iron loss CL and the exciting power VA were almost not changed in Examples 101 to 105 in which the laser processing conditions were changed from those in Example 3.

The "annular shape" means a shape which can be confirmed as being annular-edged on the edge portion of such each laser irradiation mark.

Figure 5:
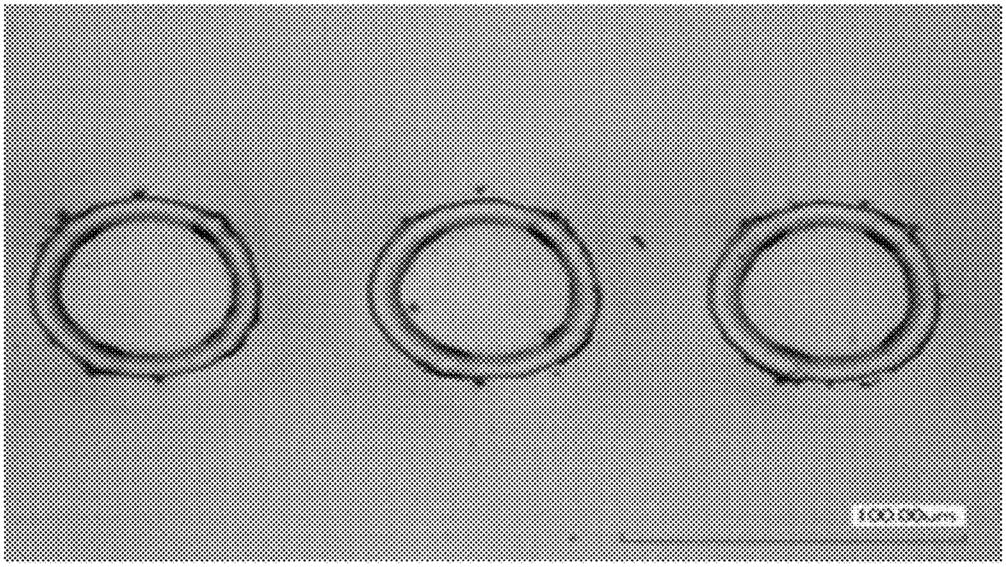
FIG. 5 is an optical micrograph illustrating one example of an annular laser irradiation mark.

FIG. 5 is an optical micrograph illustrating one example of an annular laser irradiation mark.

Three annular laser irradiation marks can be confirmed in FIG. 5. Annular edging on the edge portion of such each laser irradiation mark can be confirmed.

The "flat shape" means a spot shape which is not clearly edged and which has a substantially round shape. Specifically, the "flat shape" refers to one in which the ratio $t_1/T$ of the maximum depth $t_1$ of a depressed portion to the thickness T of the ribbon is less than 0.025.

In other words, it was confirmed that the effect of reductions in iron loss CL and exciting power VA was obtained regardless of the shape of such each laser irradiation mark as long as the line interval and the spot interval satisfied the above conditions.

Example 20

The same operation as in Example 3 was performed except that the roll contact surface of the sample piece was irradiated with pulsed laser in Example 3. The number density (marks/mm$^2$) of the laser irradiation marks in the ribbon 10 was as shown in Table 5. The results are shown in Table 5.

The maximum cross-sectional height Rt was measured in the same manner as described above according to JIS B 0601:2001 on a portion of the free solidified surface of the Fe-based amorphous alloy ribbon laser-processed, the portion being other than the laser irradiation mark rows 12 (namely, non-laser-processed region), and was 1.4 μm.

TABLE 5

| | | Roll contact surface of ribbon | | | | Magnetic characteristics | | | | |
|---|---|---|---|---|---|---|---|---|---|---|
| | | | Region laser-processed (laser irradiation mark rows) | | Number density of laser | | | | | |
| | Free solidified surface of ribbon Rt (μm) | Laser pulse energy (mJ) | Spot interval SP1 (mm) | Line interval LP1 (mm) | irradiation marks (marks/mm$^2$) | Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
| Example 20 | 1.4 | 2.0 | 0.20 | 20 | 0.25 | 0.102 | 0.155 | 1.54 | 0.116 | 0.231 |

Figure 6:
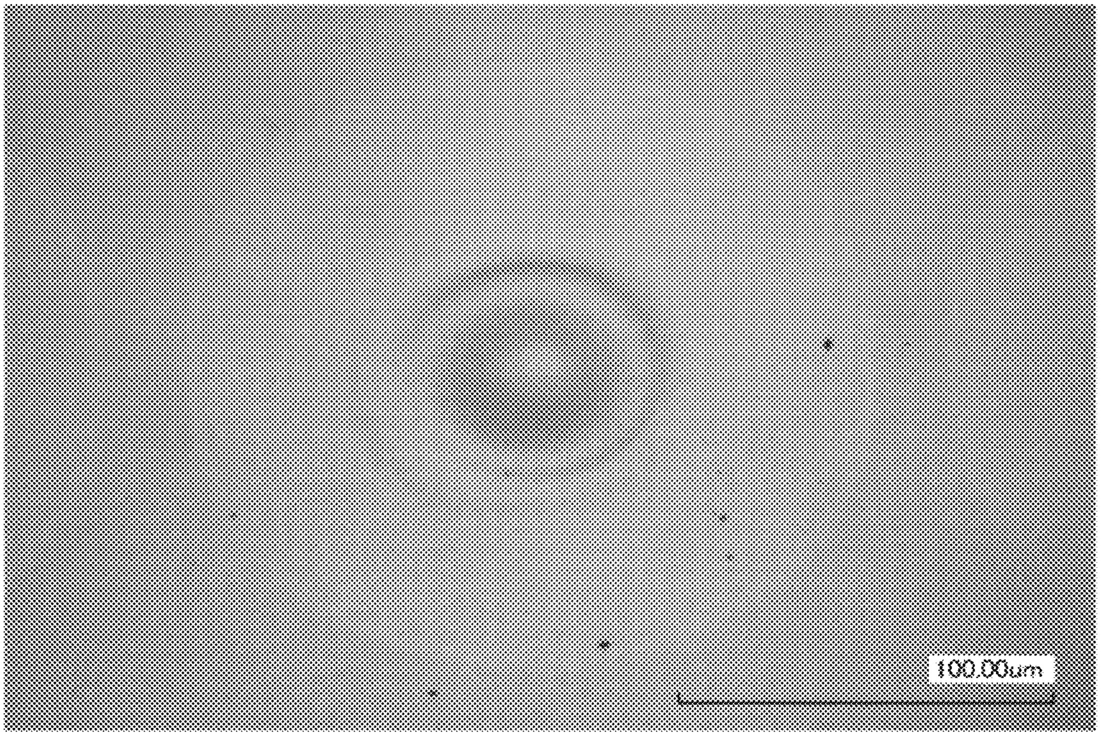
FIG. 6 is an optical micrograph illustrating one example of a flat laser irradiation mark.

FIG. 6 is an optical micrograph illustrating one example of a flat laser irradiation mark.

The maximum depth $t_1$ of the depressed portion of a flat laser irradiation mark of FIG. 6 is 0.44 μm. The thickness T of the ribbon is 25 μm and the ratio $t_1/T$ is 0.0176. In a case in which such a laser irradiation mark is flat as described above, the space between ribbons can be suppressed to result in an enhancement in ribbon density in a magnetic core in the case of layering of the ribbons for formation of the magnetic core.

It was confirmed from the above results that the shape of such each laser irradiation mark had almost no influence on the iron loss CL and the exciting power VA.

As shown in Table 5, the iron loss CL and the exciting power VA in a condition of a magnetic flux density of 1.45 T were reduced in Example 20 in which the line interval (namely, the centerline interval between the plural laser irradiation mark rows) was from 10 mm to 60 mm, the spot interval (namely, the interval between center points of the plural laser irradiation marks) was from 0.10 mm to 0.50 mm, and the number density D of the laser irradiation marks was from 0.05 marks/mm$^2$ to 0.50 marks/mm$^2$, even in a case in which the laser irradiation marks were arranged on the roll contact surface of the ribbon.

Examples 21 to 24 and Comparative Examples 6 to 9

Figure 7:
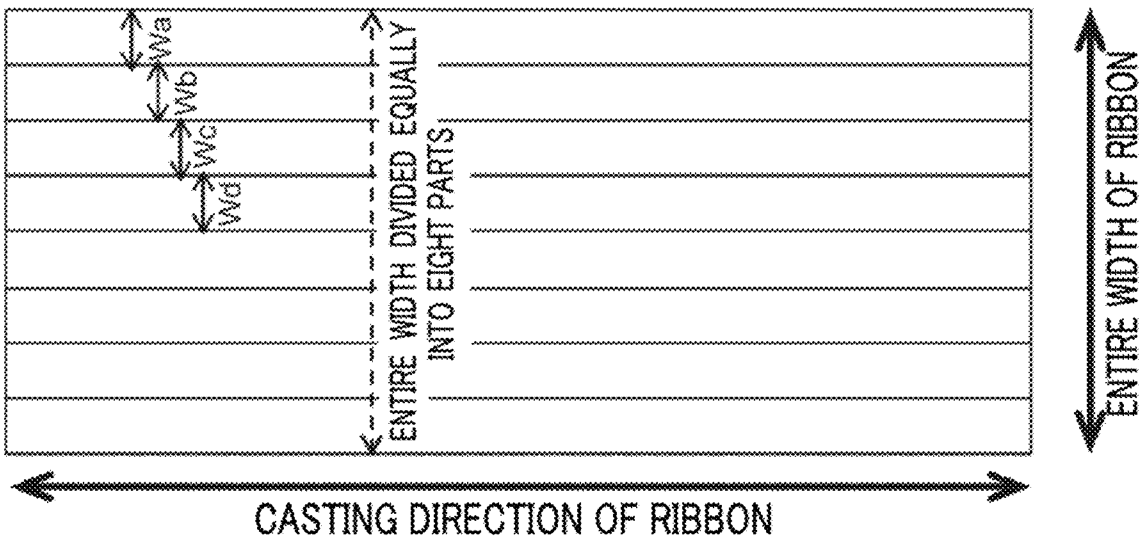
FIG. 7 is a schematic diagram illustrating each location before equal dividing, of an Fe-based amorphous alloy ribbon divided equally into eight parts in the width direction.

The Fe-based amorphous alloy ribbon as the material ribbon having a width of 210 mm, used in Example 3, was subjected to slit processing at a width length so as to be divided equally into eight parts in the width direction, as illustrated in FIG. 7, thereby obtaining four narrow alloy ribbon sample pieces Wa to Wd. The iron loss CL and the exciting power VA with respect to the resulting alloy ribbons Wa to Wd were measured in sample pieces of the alloy ribbons before laser processing (Comparative Examples 6 to 9) and in pieces of the Fe-based amorphous alloy ribbons laser-processed (Examples 21 to 24).

of a magnetic flux density of 1.45 T, as compared with Comparative Examples 7 to 9 in which no laser processing was made.

In other words, laser processing was not required to be performed in the entire width direction of the ribbon, and it was indicated that the effect of reductions in iron loss and exciting power by laser processing was exerted as long as the proportion of the length in the width direction of the laser irradiation mark rows in the entire length in the width direction of the Fe-based amorphous alloy ribbon was in a range of from 10% to 50% in each direction from the center in the width direction toward both ends in the width direction.

TABLE 6

| | Free solidified surface of ribbon | | | | | | Magnetic characteristics | | | | |
|---|---|---|---|---|---|---|---|---|---|---|---|
| | | | | Region laser-processed (laser irradiation mark rows) | | | | | | | |
| | Region not laser-processed Rt (μm) | Laser processing position *1 | Laser pulse energy (mJ) | Spot interval SP1 (mm) | Line interval LP1 (mm) | Number density of laser irradiation marks (marks/mm$^2$) | Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
| Comparative Example 6 | 1.5 | Wa | — | — | — | 0 | 0.137 | 0.707 | 1.27 | 0.162 | 1.212 |
| Example 21 | 1.7 | Wa | 2.0 | 0.20 | 20 | 0.25 | 0.128 | 0.753 | 1.25 | 0.145 | 1.310 |
| Comparative Example 7 | 1.7 | Wb | — | — | — | 0 | 0.140 | 0.162 | 1.49 | 0.162 | 0.304 |
| Example 22 | 1.4 | Wb | 2.0 | 0.20 | 20 | 0.25 | 0.100 | 0.154 | 1.51 | 0.110 | 0.236 |
| Comparative Example 8 | 1.2 | Wc | — | — | — | 0 | 0.165 | 0.180 | 1.51 | 0.169 | 0.249 |
| Example 23 | 1.5 | Wc | 2.0 | 0.20 | 20 | 0.25 | 0.103 | 0.129 | 1.54 | 0.114 | 0.194 |
| Comparative Example 9 | 1.3 | Wd | — | — | — | 0 | 0.171 | 0.185 | 1.51 | 0.175 | 0.257 |
| Example 24 | 1.7 | Wd | 2.0 | 0.20 | 20 | 0.25 | 0.100 | 0.147 | 1.52 | 0.109 | 0.254 |

*1: Laser processing positions Wa to Wd represent four ribbon positions (namely, positions of laser irradiation marks) from one end in the width direction of a ribbon in the case of the ribbon divided equally into eight parts in the width direction, as illustrated in FIG. 7.

As shown in Table 6, Example 21 in which the ribbon Wa was laser-processed was slight in effect of reductions in iron loss CL and exciting power VA by the processing, as compared with Comparative Example 6 in which no laser processing was made.

However, Examples 22 to 24 in which the ribbons Wb to Wd were laser-processed, respectively, were remarkably reduced in iron loss CL and exciting power VA in a condition

Examples 25 to 26

Figure 8:
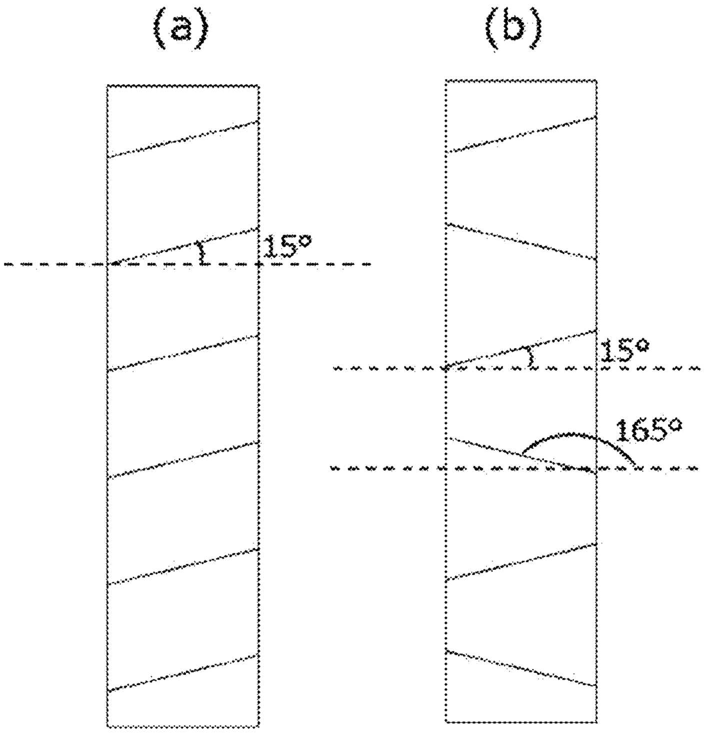
FIG. 8 is a schematic explanatory diagram for explaining providing of laser irradiation mark rows which are inclined to the width direction of an Fe-based amorphous alloy ribbon.

The same operation as in Example 3 was performed except that the direction of the laser irradiation mark rows formed by laser processing in Example 3 was inclined at 15° (or 165°) to the width direction of the ribbon (sample piece), as illustrated in FIG. 8. The results are shown in Table 7.

TABLE 7

| | Free solidified surface of ribbon | | | | | | Magnetic characteristics | | | | |
|---|---|---|---|---|---|---|---|---|---|---|---|
| | | | | Region laser-processed (laser irradiation mark rows) | | | | | | | |
| | Region not laser-processed Rt (μm) | Angle inclined to width direction of laser irradiation mark rows | Laser pulse energy (mJ) | Spot interval SP1 (mm) | Line interval LP1 (mm) | Number density of laser irradiation marks (marks/mm$^2$) | Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
| Example 25 | 1.4 | 15° Adjacent rows parallel to each other | 2.0 | 0.20 | 20 | 0.25 | 0.125 | 0.182 | 1.52 | 0.143 | 0.253 |

TABLE 7-continued

| | Free solidified surface of ribbon | | | | | | Magnetic characteristics | | | | |
|---|---|---|---|---|---|---|---|---|---|---|---|
| | Region not laser-processed Rt (μm) | Angle inclined to width direction of laser irradiation mark rows | Laser pulse energy (mJ) | Region laser-processed (laser irradiation mark rows) Spot interval SP1 (mm) | Region laser-processed (laser irradiation mark rows) Line interval LP1 (mm) | Number density of laser irradiation marks (marks/mm$^2$) | Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
| Example 26 | 1.8 | 15°/165° Adjacent rows alternately different | 2.0 | 0.20 | 20 | 0.25 | 0.119 | 0.197 | 1.49 | 0.132 | 0.349 |

As shown in Table 7, the iron loss CL and the exciting power VA in a condition of a magnetic flux density of 1.45 T were reduced even in a case in which the direction of the laser irradiation mark rows was inclined at 15° to the width direction.

Examples 27 to 29

Each Fe-based amorphous alloy ribbon of an alloy composition (having a chemical composition of $Fe_{82}Si_4B_{14}$, and having a thickness of 25 μm and a width of 210 mm) was obtained in the same manner as in Example 1. Thereafter, a sample piece of 25 mm in width was processed from the middle section of the ribbon and the free solidified surface of the sample piece was subjected to laser processing by pulsed laser, whereby laser irradiation mark rows were formed. The laser processing conditions here were as shown in Table 8 below.

The spot interval SP1 and the line interval LP1 in the laser irradiation mark rows were 0.20 mm and 20 mm, respectively, and the number density of the laser irradiation mark rows was 0.25 mm$^2$. The laser irradiation mark rows were formed in the entire region in the width direction of the ribbon piece, and respective laser irradiation marks were formed so as to be parallel to each other.

Example 30 and Comparative Example 10

Figure 9A:
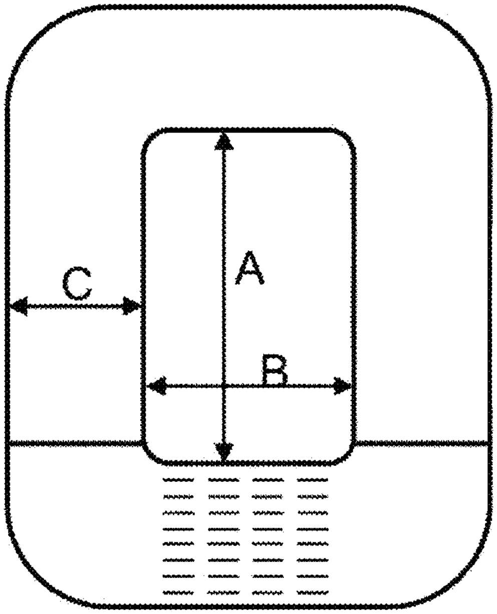
FIG. 9A is a plan view illustrating one example of an iron core obtained by bending and winding, in an overlapping manner, Fe-based amorphous alloy ribbons layered.
Figure 9B:
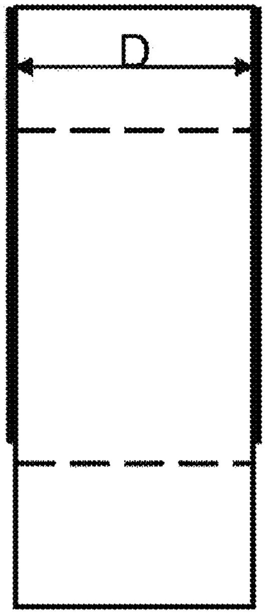
FIG. 9B is a side view of FIG. 9A.

Each Fe-based amorphous alloy ribbon (chemical composition: $Fe_{82}Si_4B_{14}$, thickness: 25 μm, width: 142 mm) was obtained in the same manner as in Example 1, and each Fe-based amorphous alloy ribbon piece was made. Plural such ribbon pieces obtained were layered to provide a laminated body, and the laminated body was bent in a U shape, and wound with both ends thereof being overlapped, thereby providing an iron core having structures illustrated in FIG. 9A and FIG. 9B. The shape of the iron core had a window frame height A of 330 mm, a window frame width B of 110 mm, a ribbon layer thickness C of 55 mm, and a height D of 142 mm (146 mm in a case in which the thickness of a resin coating described below was included), as illustrated in FIG. 9A and FIG. 9B. The lamination factor and the weight of the iron core were 86% and 53 kg, respectively.

The iron core was wound in an overlapping manner in a lower portion illustrated in FIG. 9A and FIG. 9B. In a case in which plural such ribbon pieces were layered to provide a laminated body, a resin coating was applied to a laminated surface at the halfway of the laminated body so that such ribbon pieces were not away from each other.

The resulting iron core was subjected to measurements of the iron loss CL and the exciting power VA.

Figure 10:
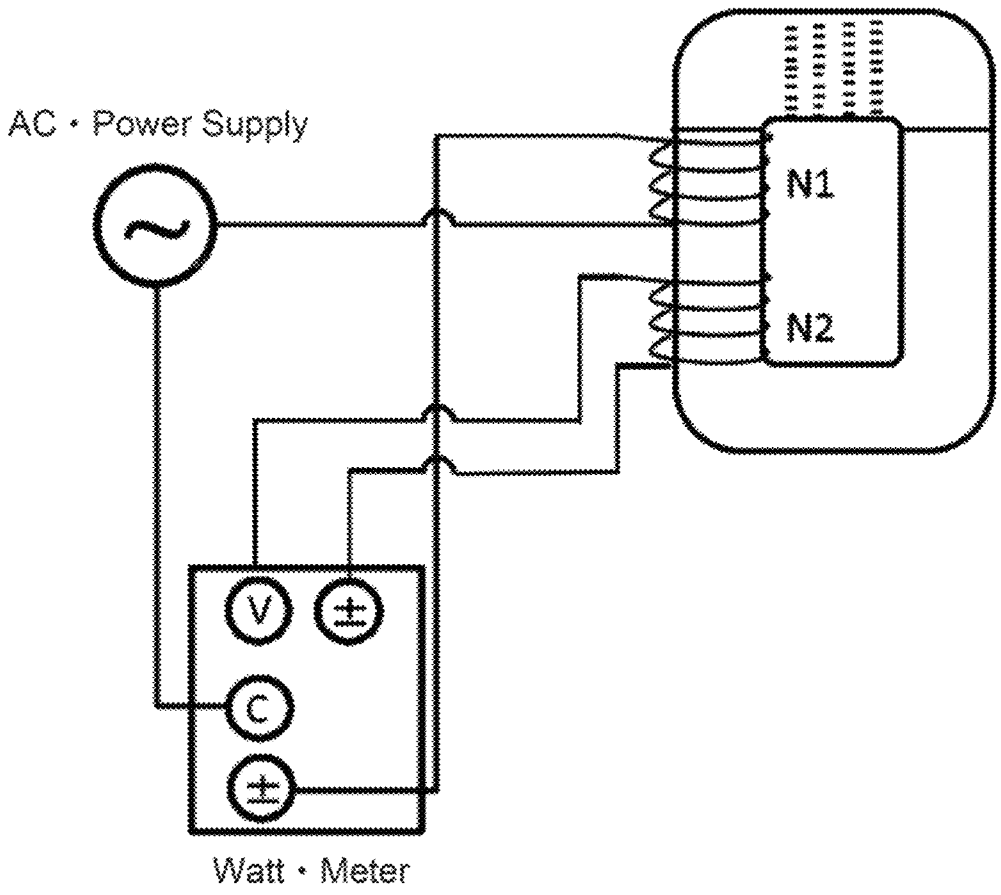
FIG. 10 is a circuit diagram illustrating a circuit for transformation by winding a primary winding wire (N1) and a secondary winding wire (N2) around the iron core, as one example illustrated in FIG. 9A.

As illustrated in FIG. 10, a primary winding wire (N1) and a secondary winding wire (N2) were wound as coils onto the iron core, and the frequency was 60 Hz and the magnetic flux densities were 1.45 T and 1.5 T. The number of windings of the primary winding wire was 10 turns and the number of windings of the secondary winding wire was 2 turns. Thus, a transformable circuit was produced.

TABLE 8

| | Free solidified surface of ribbon | | | | | | Magnetic characteristics | | | | |
|---|---|---|---|---|---|---|---|---|---|---|---|
| | Region not laser-processed Rt (μm) | Pulse width (nsec) | Laser pulse energy (mJ) | Region laser-processed (laser irradiation mark rows) Spot interval SP1 (mm) | Region laser-processed (laser irradiation mark rows) Line interval LP1 (mm) | Number density of laser irradiation marks (marks/mm$^2$) | Iron loss CL (W/kg) at 1.45 T 60 Hz | Exciting power VA (VA/kg) at 1.45 T 60 Hz | Magnetic flux density B0.1 (T) at 7.9557 A/m 60 Hz | Iron loss CL (W/kg) at 1.50 T 60 Hz | Exciting power VA (VA/kg) at 1.50 T 60 Hz |
| Example 27 | 1.3 | 100 | 1.0 | 0.20 | 20 | 0.25 | 0.140 | 0.165 | 1.53 | 0.146 | 0.276 |
| Example 28 | 1.3 | 250 | 1.0 | 0.20 | 20 | 0.25 | 0.120 | 0.132 | 1.55 | 0.136 | 0.219 |
| Example 29 | 1.4 | 500 | 1.0 | 0.20 | 20 | 0.25 | 0.109 | 0.145 | 1.54 | 0.121 | 0.252 |

As shown in Table 8, the effect of reductions in iron loss CL and exciting power VA in a condition of a magnetic flux density of 1.45 T was exerted even in the case of the change in pulse width.

The voltage E (V) read out by a power meter, the apparent power (VA/kg) obtained by the maximum magnetic flux density B. (T) converted and the prescribed magnetic flux density B. (T), and the iron loss (W/kg) were calculated by the following Formula 1, Formula 2, and Formula 3, respectively. The measurement results are shown in Table 9.

An iron core produced for comparison in the same manner as described above except that a ribbon piece in which no laser irradiation mark rows were formed was used was subjected to the same measurement and evaluation.

$$\text{voltage } E\ (V)=4.443\ LF\cdot C\cdot W\cdot N_1\cdot f\cdot B_m\times 10^{-6} \quad \text{Formula 1}$$

$$\text{apparent power (VA/kg)}=E\cdot I/M \quad \text{Formula 2}$$

$$\text{iron loss (W/kg)}=\text{Watt}/M \quad \text{Formula 3}$$

The details of symbols in Formula 1 to Formula 3 are as follows.

E: effective voltage (V) measured by power meter

LF: lamination factor (=0.86)

C: thickness (mm) of core with layering

W: nominal width (mm) of ribbon used $N_1$: number of windings of excitation coil f: frequency (Hz) measured $B_m$: maximum magnetic flux density or prescribed magnetic flux density I: effective current (A) measured by power meter M: weight (kg) of core Watt: power (W) measured by power meter

TABLE 9

| | Free solidified surface of ribbon wound in an overlapping manner | | | | | Magnetic characteristics | | | |
|---|---|---|---|---|---|---|---|---|---|
| | Region not laser-processed Rt (µm) | Laser pulse energy (mJ) | Region laser-processed (laser irradiation mark rows) Spot interval SP1 (mm) | Region laser-processed (laser irradiation mark rows) Line interval LP1 (mm) | Number density of laser irradiation marks (marks/mm$^2$) | Iron loss CL (W/kg) at 1.45 T 60 Hz | Exciting power VA (VA/kg) at 1.45 T 60 Hz | Iron loss CL (W/kg) at 1.50 T 60 Hz | Exciting power VA (VA/kg) at 1.50 T 60 Hz |
| Comparative Example 10 | 1.4 | — | — | — | 0 | 0.261 | 0.548 | 0.280 | 0.729 |
| Example 30 | 1.3 | 2.0 | 0.20 | 20 | 0.25 | 0.162 | 0.457 | 0.181 | 0.643 |

As shown in Table 9, the iron loss CL measured at 1.45 T and 60 Hz in the iron core using the ribbon piece in which no laser irradiation mark rows were formed was 0.261 W/kg, and that in the iron core using the ribbon piece in which the laser irradiation mark rows were formed, according to the embodiment, was 0.162 W/kg which corresponded to a numerical value reduced by three tenths or more.

A reduction in iron loss CL to 0.2 W/kg or less in an iron core has not been able to be conventionally achieved at all. Thus, any coil can be provided in the iron core of the embodiment, thereby allowing a transformer extremely low in power loss to be obtained.

The disclosure of Japanese Patent Application No. 2018-069453 filed on Mar. 30, 2018 is herein incorporated by reference in its entity.

All documents, patent applications, and technical standards described herein are herein incorporated by reference, as if each individual document, patent application, and technical standard were specifically and individually indicated to be incorporated by reference.

The invention claimed is:

1. An Fe-based amorphous alloy ribbon having a free solidified surface and a roll contact surface, wherein the Fe-based amorphous alloy ribbon has a plurality of laser irradiation mark rows each configured from a plurality of laser irradiation marks on at least one surface of the free solidified surface or the roll contact surface; and wherein the Fe-based amorphous alloy ribbon has:

a line interval of from 30 mm to 60 mm, the line interval being defined as a centerline interval in a middle section in a width direction, between mutually adjacent laser irradiation mark rows of a plurality of such laser irradiation mark rows arranged in a casting direction of the Fe-based amorphous alloy ribbon, the width direction being orthogonal to the casting direction, a spot interval of from 0.10 mm to 0.50 mm, the spot interval being defined as an interval between center points of the plurality of laser irradiation marks in each of the plurality of laser irradiation mark rows, and a number density D of the laser irradiation marks of from 0.05 marks/mm$^2$ to 0.50 marks/mm$^2$, provided that the line interval is d1 (mm), the spot interval is d2 (mm), and the number density D of the laser irradiation marks is D=(1/d1)×(1/d2), and wherein the Fe-based amorphous alloy ribbon has an iron loss, under conditions of a frequency of 60 Hz and a magnetic flux density of 1.45 T, of 0.160 W/kg or less, and an exciting power, under conditions of a frequency of 60 Hz and a magnetic flux density of 1.45 T, of 0.200 VA/kg or less.

2. The Fe-based amorphous alloy ribbon according to claim 1, wherein a proportion of a length in the width direction of the laser irradiation mark rows in an entire length in the width direction of the Fe-based amorphous alloy ribbon is in a range of from 10% to 50% in each direction from the center in the width direction toward both ends in the width direction.

3. The Fe-based amorphous alloy ribbon according to claim 1, wherein the laser irradiation mark rows are formed at least in six middle regions in the width direction that are regions other than two regions at both ends of eight regions obtained by equally dividing the Fe-based amorphous alloy ribbon into eight parts in the width direction.

4. The Fe-based amorphous alloy ribbon according to claim 1, wherein the free solidified surface has a maximum cross-sectional height Rt of 3.0 µm or less.

5. The Fe-based amorphous alloy ribbon according to claim 1, consisting of Fe, Si, B, and impurities, wherein a content of Fe is 78 atom % or more, a content of B is 11 atom % or more, and a total content of B and Si is from 17 atom % to 22 atom % when a total content of Fe, Si, and B is 100 atom %.

6. The Fe-based amorphous alloy ribbon according to claim 1, having a thickness of from 20 μm to 35 μm.

7. The Fe-based amorphous alloy ribbon according to claim 1, consisting of Fe, Si, B, and impurities, wherein a content of Fe is 80 atom % or more, a content of B is 12 atom % or more, and a total content of B and Si is from 17 atom % to 20 atom % when a total content of Fe, Si, and B is 100 atom %.

8. The Fe-based amorphous alloy ribbon according to claim 1, having a magnetic flux density B0.1, under conditions of a frequency of 60 Hz and a magnetic field of 7.9557 A/m, of 1.52 T or more.

9. The Fe-based amorphous alloy ribbon according to claim 1, for use at an operating magnetic flux density Bm, wherein a ratio of operating magnetic flux density Bm/saturated magnetic flux density Bs, is from 0.88 to 0.94.

10. The Fe-based amorphous alloy ribbon according to claim 1, wherein each laser irradiation mark has a flat shape in a planar view, in which a ratio $t_1/T$ of a maximum depth $t_1$ of a depressed portion of the laser irradiation mark to a thickness T of the Fe-based amorphous alloy ribbon is less than 0.025.

11. A method of producing the Fe-based amorphous alloy ribbon according to claim 1, comprising preparing a material ribbon comprising an Fe-based amorphous alloy and having a free solidified surface and a roll contact surface, and forming a plurality of laser irradiation mark rows each configured from a plurality of laser irradiation marks on at least one surface of the free solidified surface or the roll contact surface of the material ribbon, by laser processing, thereby obtaining the Fe-based amorphous alloy ribbon.

12. The method of producing an Fe-based amorphous alloy ribbon according to claim 11, wherein the laser irradiation marks are formed using a laser with a pulse energy of from 0.4 mJ to 2.5 mJ.

13. The method of producing an Fe-based amorphous alloy ribbon according to claim 11, wherein the laser irradiation marks are formed using a laser with a pulse width of laser for forming the laser irradiation marks of 50 nsec or more.

14. An iron core, comprising a layered Fe-based amorphous alloy ribbon that includes a plurality of the Fe-based amorphous alloy ribbons according to claim 1, and that is bent and wound in an overlapping manner, wherein the iron core has an iron loss, under conditions of a frequency of 60 Hz and a magnetic flux density of 1.45 T, of 0.250 W/kg or less.

15. A transformer, comprising an iron core that includes the Fe-based amorphous alloy ribbon according to claim 1, and a coil wound around the iron core, wherein the iron core is formed by layering the Fe-based amorphous alloy ribbon and bending and winding the layered Fe-based amorphous alloy ribbon in an overlapping manner, and has an iron loss of 0.250 W/kg or less, under conditions of a frequency of 60 Hz and a magnetic flux density of 1.45 T.

* * * * *